(12) United States Patent
Kubo et al.

(10) Patent No.: US 7,495,776 B2
(45) Date of Patent: Feb. 24, 2009

(54) THREE-DIMENSIONAL MEASURING SYSTEM

(75) Inventors: Akira Kubo, Itami (JP); Shinichi Horita, Osaka (JP); Yoshihisa Abe, Sakai (JP)

(73) Assignee: Konica Minolta Sensing, Inc., Sakai-Shi (JP)

( * ) Notice: Subject to any disclaimer, the term of this patent is extended or adjusted under 35 U.S.C. 154(b) by 186 days.

(21) Appl. No.: 11/268,948

(22) Filed: Nov. 8, 2005

(65) Prior Publication Data
US 2006/0290945 A1 Dec. 28, 2006

(30) Foreign Application Priority Data
Jun. 22, 2005 (JP) ............... 2005-182185

(51) Int. Cl.
G01B 11/24 (2006.01)
G06T 15/30 (2006.01)
(52) U.S. Cl. ............. 356/601; 356/602; 356/625; 435/428; 435/423
(58) Field of Classification Search ......... 356/601–625; 435/419–420, 423, 428, 426
See application file for complete search history.

(56) References Cited

U.S. PATENT DOCUMENTS

| 5,058,988 | A | * | 10/1991 | Spence | 356/121 |
| 5,073,910 | A | * | 12/1991 | Eberhard et al. | 378/4 |
| 5,461,478 | A | * | 10/1995 | Sakakibara et al. | 346/623 |
| 5,623,583 | A | * | 4/1997 | Nishino | 345/420 |
| 5,977,987 | A | * | 11/1999 | Duluk, Jr. | 345/441 |
| 5,999,185 | A | * | 12/1999 | Kato et al. | 345/420 |
| 6,415,050 | B1 | * | 7/2002 | Stegmann et al. | 382/154 |
| 6,778,172 | B2 | * | 8/2004 | Harada et al. | 345/419 |
| 6,798,527 | B2 | * | 9/2004 | Fukumoto et al. | 356/602 |
| 6,958,753 | B2 | * | 10/2005 | Abe | 345/423 |
| 2002/0003539 | A1 | * | 1/2002 | Abe | 345/428 |

FOREIGN PATENT DOCUMENTS

| JP | 7-18698 | 3/1995 |
| JP | 10-2712 | 1/1998 |
| JP | 2002-71345 | 3/2002 |
| JP | 2002-328952 | 11/2002 |

OTHER PUBLICATIONS

Japanese Official Communication dated Aug. 16, 2007 for corresponding Japanese patent application No. 2005-182185.

* cited by examiner

*Primary Examiner*—Sang Nguyen
(74) *Attorney, Agent, or Firm*—Sidley Austin LLP

(57) ABSTRACT

A three-dimensional measuring system for measuring a three-dimensional shape of a measurement object in a non-contact manner includes a first obtaining portion for obtaining arrangement information of the measurement object, a second obtaining portion for obtaining design shape information of the measurement object, a fourth obtaining portion for obtaining specifics information about one or more three-dimensional measuring devices, a determining portion for determining a measurable part that can be measured by the three-dimensional measuring device about a surface shape of the measurement object in accordance with the obtained arrangement information, the obtained design shape information and the obtained specifics information, and an output portion for outputting the determined measurable part.

29 Claims, 23 Drawing Sheets

THREE-DIMENSIONAL MEASURING SYSTEM

This application is based on Japanese Patent Application No. 2005-182185 filed on Jun. 22, 2005, the contents of which are hereby incorporated by reference.

BACKGROUND OF THE INVENTION

1. Field of the Invention

The present invention relates to a three-dimensional measuring system for measuring a three-dimensional shape of a measurement object in a noncontact manner.

2. Description of the Prior Art

Conventionally, noncontact three-dimensional measurement (three-dimensional measurement) is often used for measuring a three-dimensional shape of a measurement object. The three-dimensional measurement includes a passive type such as a lens focus method or a stereo image method and an active type such as a light radar method or a light projection method. In the stereo image method, the measurement object is shot from plural different positions by a camera, for example. Then, three-dimensional coordinates of each point on the measurement object are calculated from the plural obtained images by the principle of triangulation. In addition, according to the light projection method, detection light is projected to the measurement object, and light reflected by the measurement object is received by an imaging element. If slit light is used as the detection light, the method is called a slit light projection method (it is also called an optical cutting method). According to the slit light projection method, the slit light is deflected so that the measurement object is scanned optically, and three-dimensional coordinates of each point on the measurement object is calculated from deformation degree of the slit light based on a surface shape of the measurement object by the principle of triangulation.

In order to obtain a complete set of three-dimensional shape data of one measurement object, it is necessary to perform the three-dimensional measurement of the measurement object plural times so as to combine and integrate the plural obtained three-dimensional shape data.

Conventionally, it is common method to measure a measurement object using a three-dimensional measuring device by manual operation of an operator. It is also common to refer to design information or CAD information of the measurement object in order to assist the three-dimensional measurement or other various measurements (see Japanese unexamined patent publication No. 2002-328952).

In addition, a device for measuring a surface shape and dimensions accurately is proposed, in which plural pieces of three-dimensional position information of a noncontact displacement gage is determined on a measurement path corresponding to plural measurement points set on the measurement object (see Japanese patent No. 7-18698).

However, there is a case where a part of a measurement object cannot be measured by the three-dimensional measuring device depending on a surface shape of the measurement object. In other words, a real three-dimensional measuring device has its predetermined specifics including a measurable angle of view, a resolution, measurement accuracy and a time period necessary for one measurement. There is a case where the entire surface shape of the measurement object cannot be measured depending on specifics of the three-dimensional measuring device. For example, if a surface shape of the measurement object is complicated or has a narrow hole, there is occurred a dead angle (occlusion) at which the measurement is disabled even if the measurement is performed from any direction. The convenient and current situation is that the three-dimensional measurement is performed as much as possible by the operator's experience and guesswork.

As described above, the current situation is that when a measurement object is measured by a three-dimensional measuring device the measurement ends up depending on the operator's know-how. For this reason, even a skilled operator consumes much time for determining an optimal position relationship for measurement by cut and try and for measuring one point many times by cut-and-try methods. If plural three-dimensional measuring devices are used, each of them may require the measurement of many times by cut-and-try methods. In addition, there is a case where the measurement fails at last after consuming much time for the measurement.

Such a waste of time and efforts may be caused because that it is difficult to determine to which extent the measurement object can be measured by a really available three-dimensional measuring device and that the three-dimensional measurement depends on the operator's know-how.

SUMMARY OF THE INVENTION

An object of the present invention is to reduce time and efforts in measuring a measurement object using a three-dimensional measuring device, by automatic determination of a part that can be measured by the three-dimensional measuring device and the other part rather than by operator's operation.

A system according to the present invention is a three-dimensional measuring system for measuring a three-dimensional shape of a measurement object in a noncontact manner, which includes means for obtaining arrangement information of the measurement object, means for obtaining design shape information of the measurement object, means for obtaining specifics information about one or more three-dimensional measuring devices, a determining portion for determining a measurable part that can be measured by the three-dimensional measuring device about a surface shape of the measurement object in accordance with the obtained arrangement information, the obtained design shape information and the obtained specifics information, and an output portion for outputting the determined measurable part.

Preferably, the three-dimensional measuring system further includes means for obtaining characteristics information about a surface state or measurement accuracy of the measurement object, and the determining portion determines the measurable part by using the obtained characteristics information too.

In addition, the output portion displays the measurable part on a screen of a display device. In addition, the determining portion determines an optimal measurement condition too for measuring the measurable part by the three-dimensional measuring device when the measurable part is determined, and the output portion outputs the determined optimal measurement condition.

In addition, the system further includes a manipulator that is capable of moving the three-dimensional measuring device for positioning, and the manipulator is adapted to be controlled in accordance with the optimal measurement condition outputted from the output portion.

As for the design shape information, information obtained from CAD data of the measurement object or master measured shape data information obtained by measurement using the three-dimensional measuring device can be used. As for the characteristics information, information obtained from CAD data of the measurement object or information entered by a user who operates an input portion can be used.

In addition, it is possible that the system further includes means for obtaining a measurement allowable time or a measurement allowable number of times in measuring the measurement object by the three-dimensional measuring device, and that the measurable part is determined in accordance with the measurement allowable time or the measurement allowable number of times too.

According to the present invention, time and efforts necessary for the measurement can be reduced by determining a measurable part automatically in measuring a measurement object using a three-dimensional measuring device.

DESCRIPTION OF THE PREFERRED EMBODIMENTS

Hereinafter, the present invention will be explained more in detail with reference to embodiments and drawings.

Figure 1:
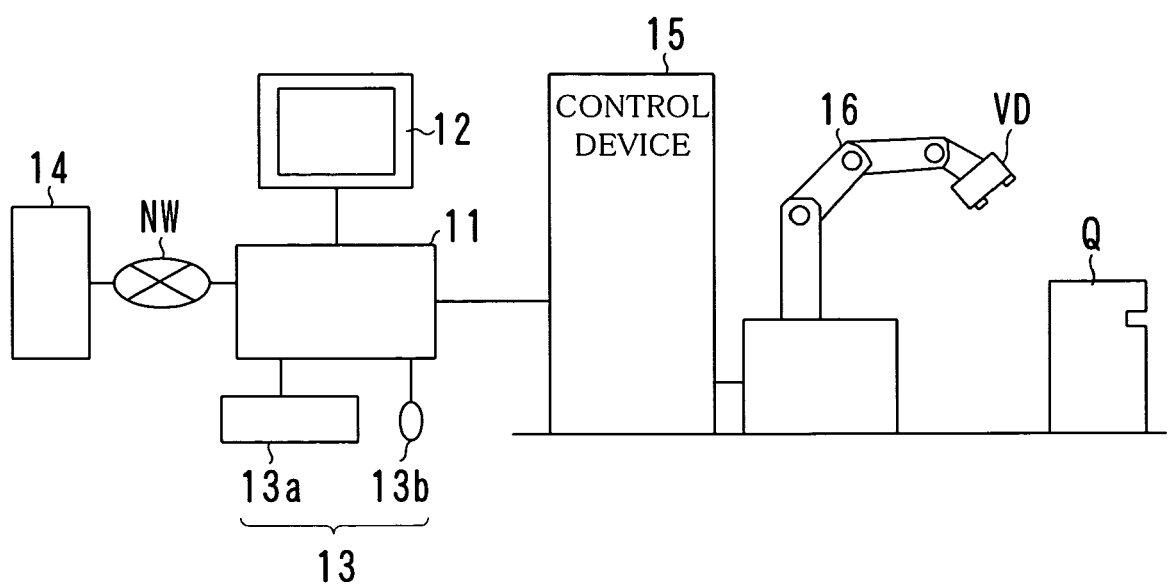
FIG. 1 is a block diagram showing a structure of a three-dimensional measuring system according to the present invention.

FIG. 1 is a block diagram showing a structure of a three-dimensional measuring system 1 according to the present invention.

As shown in FIG. 1, the three-dimensional measuring system 1 is made up of a processing device 11, a display device 12, an input device 13 such as a keyboard 13a or a mouse 13b, a CAD system 14, a control device 15, a manipulator 16 and the like.

The processing device 11 includes a processing unit (CPU), a RAM, a ROM, a hard disk drive, various types of media drives, various types of network interfaces, a control interface and other interfaces. Various storage areas necessary for processing are allotted to the hard disk drive, and there are installed a program, which is a feature of this embodiment, for a process of determining a measurable part of a measurement object Q that can be measured by three-dimensional measurement, a program for outputting a determination result to various equipment, other various programs and data. It is possible to store a part or a whole of the programs or the data in the ROM. The programs and the data are loaded to the RAM as necessity so that the processing unit executes the programs. It is possible that the programs are transferred from various types of media or downloaded via a network NW.

The display device 12 displays various pictures HG that will be described later, various data, images and messages on a screen using a LCD, a PDP, a CRT or the like. Only one display device 12 may be used in some cases, and plural display devices 12 in other cases. In addition, the display device 12 is usually capable of displaying multiple windows.

The input device 13 is operated by an operator (user) so that arrangement information, design shape information or characteristics information of the measurement object that will be described later, and specifics information (characteristics information) of the three-dimensional measuring device VD can be entered. Note that the number of the three-dimensional measuring devices VD is not limited to one but plural three-dimensional measuring devices VD may be used.

As the processing device 11, the display device 12 and the input device 13, a so-called personal computer can be used.

The CAD system 14 generates or accumulates CAD data of various mechanical devices, products, utilities and other article. In other words, CAD data include design shape information such as design drawings and dimension data of the article as well as characteristics information such as material, quality of material, surface roughness and dimension tolerances of each part that constitutes the article. The CAD system 14 is connected with the processing device 11 via the network NW, and it is capable of transmitting a whole or a part of the CAD data to the processing device 11 responding to a request from the processing device 11. Note that the CAD data can be also passed on a file base without using the network.

The control device 15 controls the manipulator 16 in accordance with an instruction from the processing device 11. In other words, when the processing device 11 determines a three-dimensional measurable part of the measurement object Q, it can also determine an optimal measurement condition for measuring the measurable part by the three-dimensional measuring device VD. If there are plural three-dimensional measuring devices VD, the determination of a measurable part and the determination of an optimal measurement condition are performed for each three-dimensional measuring device VD as necessity.

The control device 15 is capable of obtaining a signal indicating the optimal measurement condition from the processing device 11 and controlling the manipulator 16 in accordance with the signal. The manipulator 16 is capable of moving and positioning the three-dimensional measuring device VD when the three-dimensional measuring device VD is attached to a predetermined position in the end portion of its arm. The three-dimensional measuring device VD executes the three-dimensional measurement at the adjusted position in accordance with an instruction from the processing device 11.

Moreover, the control device 15 includes an input portion for entering arrangement information HJ or the like that indicates a position and a posture of the measurement object Q, and an arrangement information memory portion for setting the arrangement information HJ.

As shown in FIG. 1, the measurement object Q is set to a predetermined position in a predetermined posture for the three-dimensional measurement. Usually, the measurement object Q is set on a stage so that the bottom of the measurement object Q is at the lower side. The arrangement information HJ of the measurement object Q can also be entered by the operator who has set the measurement object Q and uses the input device 13 or an input portion of the control device 15. In addition, if a positioning device is complete for setting the measurement object Q, it is possible to set the arrangement information HJ in the control device 15 beforehand in accordance with the positioning device. In addition, it is also possible to obtain the arrangement information HJ automatically by measuring roughly by an instrument (not shown) and to transmit the arrangement information HJ to the processing device 11 via an appropriate interface.

The three-dimensional measuring device VD performs the three-dimensional measurement of the measurement object Q set as described above so as to obtain three-dimensional shape data SD of each part. When the measurement is performed, its position and posture are determined by the manipulator 16 that is controlled by the control device 15. The measured three-dimensional shape data SD are entered into the processing device 11 via an appropriate interface or entered into another appropriate computer.

Furthermore, it is possible to perform the three-dimensional measurement of the measurement object Q without using the manipulator 16 by the operator who carries the three-dimensional measuring device VD and decides its position and posture manually. In this case, the operator may view the picture HG that is displayed on the screen of the display device 12 and indicates the measurable part so as to determine the position and the posture of the three-dimensional measuring device VD.

Figure 2:
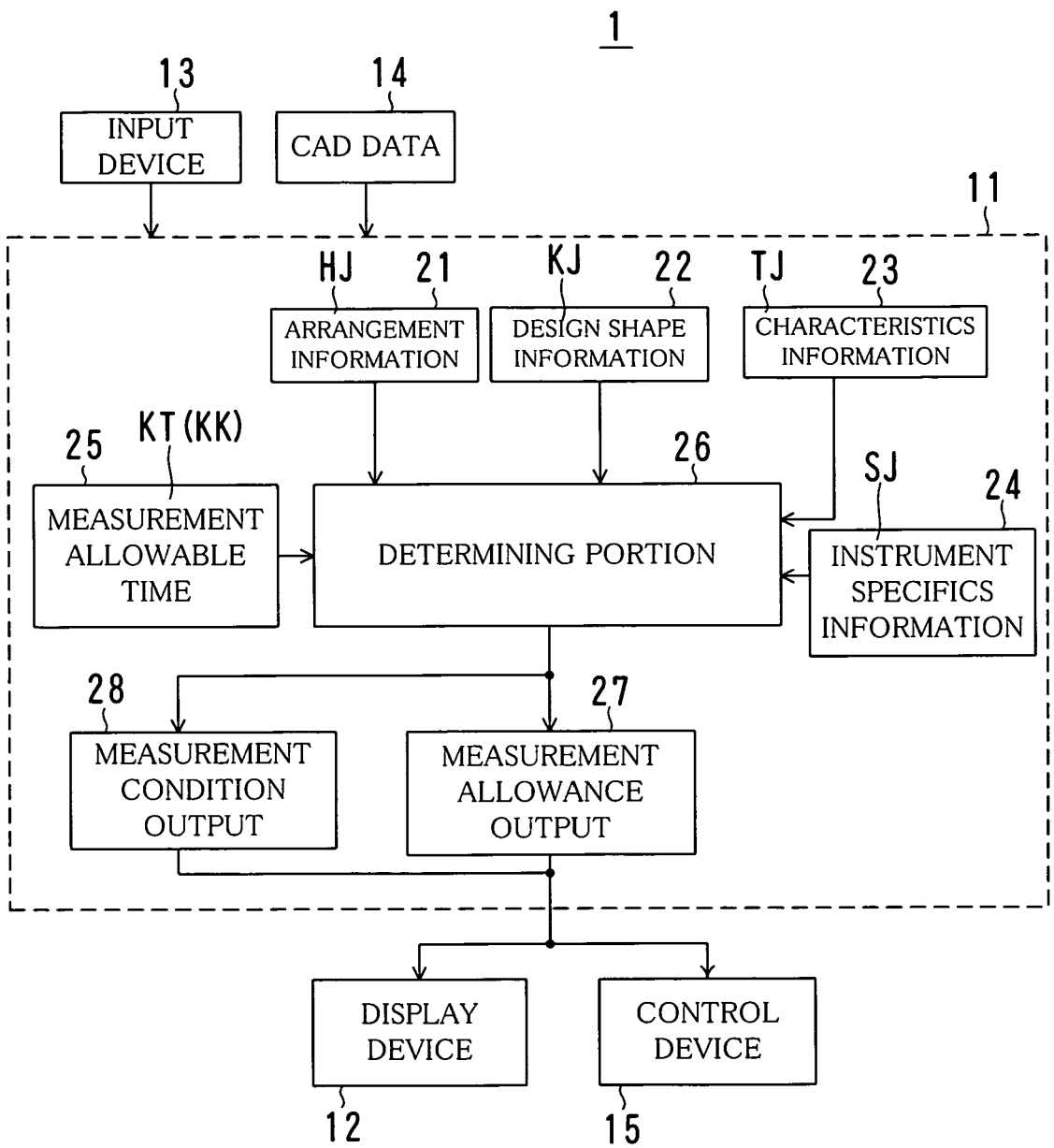
FIG. 2 is a block diagram showing a functional structure of a processing device.

FIG. 2 is a block diagram showing a functional structure of the processing device 11.

As shown in FIG. 2, the processing device 11 is provided with an arrangement information storing portion (first obtaining portion) 21, a design shape information storing portion (second obtaining portion) 22, a characteristics information storing portion (third obtaining portion) 23, an instrument specifics information storing portion (fourth obtaining portion) 24, a measurement allowable time storing portion (fifth obtaining portion) 25, a determining portion 26, a measurement allowance output portion 27 and a measurement condition output portion 28.

The arrangement information HJ of the measurement object Q is obtained and stored in the arrangement information storing portion 21. As described above, the arrangement information HJ can be obtained from the input device 13, the control device 15 or the like. The arrangement information storing portion 21 basically stores the arrangement information HJ of the measurement object Q that is currently set.

The design shape information KJ of the measurement object Q is obtained and stored in the design shape information storing portion 22. The design shape information KJ can be obtained by transmitting predetermined data from the CAD system 14. In addition, the design shape information KJ can also be obtained by performing the three-dimensional measurement of the measurement object Q using the three-dimensional measuring device VD. Moreover, the design shape information KJ can also be obtained by performing the three-dimensional measurement of the measurement object Q using another three-dimensional measuring device (not shown). Thus, the master measured shape data information obtained by the three-dimensional measuring device can be used as the design shape information KJ.

The characteristics information TJ of the measurement object Q is obtained and stored in the characteristics information storing portion 23. The characteristics information TJ includes material, quality of material, surface roughness, color, surface reflectance, transmittance, dimension tolerances and dimension accuracy as described above. The characteristics information TJ can be obtained by transmitting predetermined data from the CAD system 14. In addition, it is also possible to enter the characteristics information TJ from the input device 13.

The instrument specifics information storing portion 24 stores the specifics information SJ of the three-dimensional measuring device VD, i.e., measurable angle of view of the three-dimensional measuring device VD, resolution, measurement accuracy, time necessary for measurement of one time, and dimensions and shapes of the three-dimensional measuring device VD. The specifics information SJ can also be called instrument characteristics information. The specifics information SJ can be obtained by transmitting data related to the three-dimensional measuring device VD therefrom. In addition, the specifics information SJ can also be entered from the input device 13.

When the measurement object Q is measured by the three-dimensional measuring device VD, the measurement allowable time storing portion 25 stores measurement allowable time KT that is allowed for the measurement or measurement allowable number of times KK that is allowed for the measurement. The measurement allowable time KT or the measurement allowable number of times KK can be entered and set by an operator from the input device 13. In addition, it is possible to calculate or determine the measurement allowable time KT or the measurement allowable number of times KK automatically in accordance with various types of information owned by the CAD system 14 about the measurement object Q.

Note that it is possible to store the design shape information KJ and the characteristics information TJ for plural measurement objects Q in the design shape information storing portion 22 and the characteristics information storing portion 23, respectively. In addition, it is possible to store the specifics information SJ for plural three-dimensional measuring devices VD in the instrument specifics information storing portion 24. It is possible to store the measurement allowable time KT or the measurement allowable number of times KK for plural three-dimensional measuring devices VD or for plural measurement objects Q in the measurement allowable time storing portion 25.

The determining portion 26 determines a measurable part KB that can be measured by the three-dimensional measuring device VD about the surface shape of the measurement object Q in accordance with the arrangement information HJ, the design shape information KJ, the characteristics information TJ, the specifics information SJ and the measurement allowable time KT or the measurement allowable number of times KK. In other words, it is possible to indicate the measurable part KB and a non-measurable part HB of the measurement object Q. Along with determination of the measurable part KB, its optimal measurement condition SC is also determined, so that the optimal measurement condition SC of the measurable part KB can be indicated.

The measurement allowance output portion 27 outputs information about the measurable part KB and the non-measurable part HB determined by the determining portion 26 to the display device 12, the control device 15 and other equipment. The measurement condition output portion 28 outputs information about the measurement condition SC to external equipment in the same manner.

Next, an operation, a procedure of the process, an action and the like of the three-dimensional measuring system 1 will be described with reference to a determining process of the processing device 11 mainly.

Figure 3:
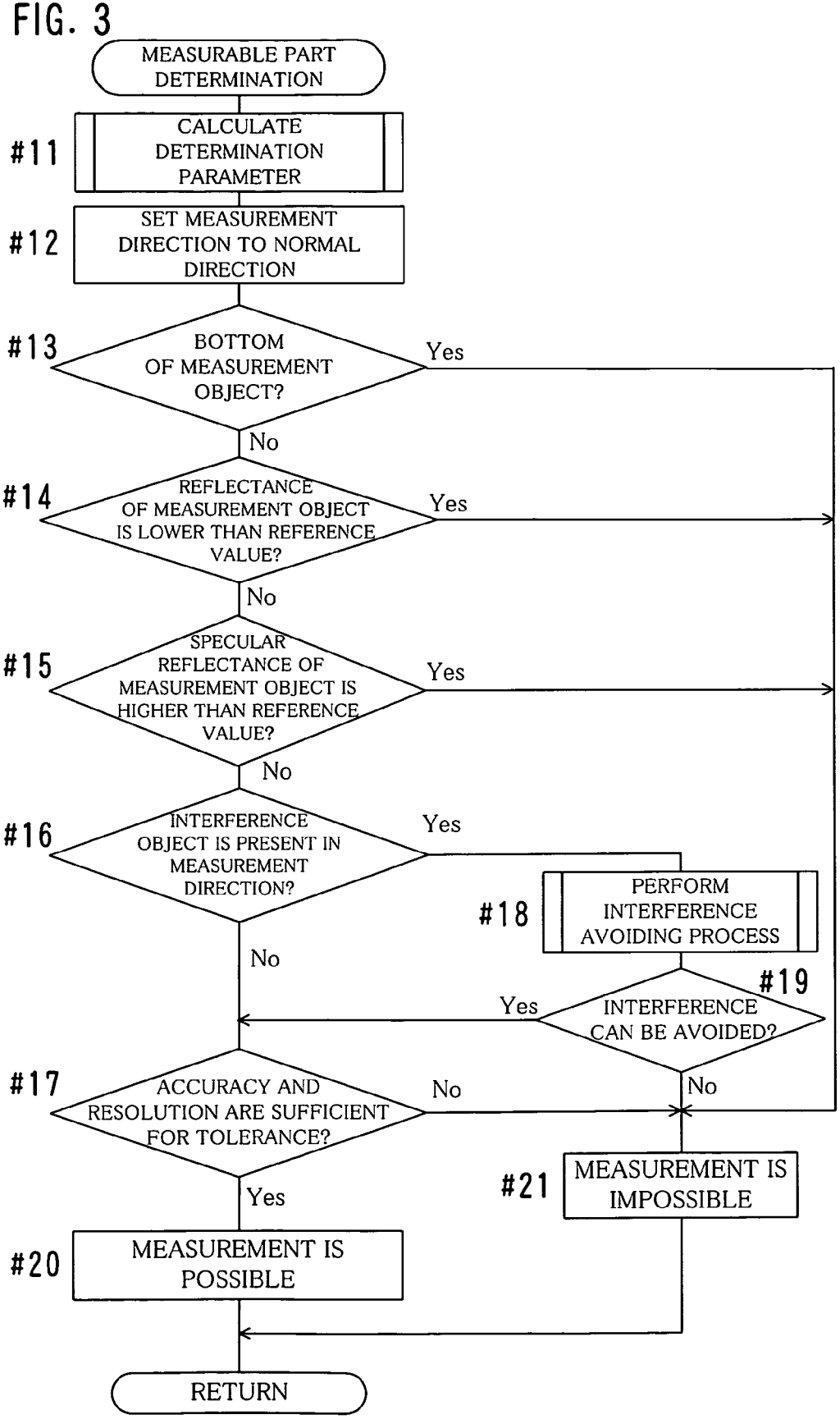
FIG. 3 is a flowchart showing a process of determining a part that can be measured by three-dimensional measurement.
Figure 4:
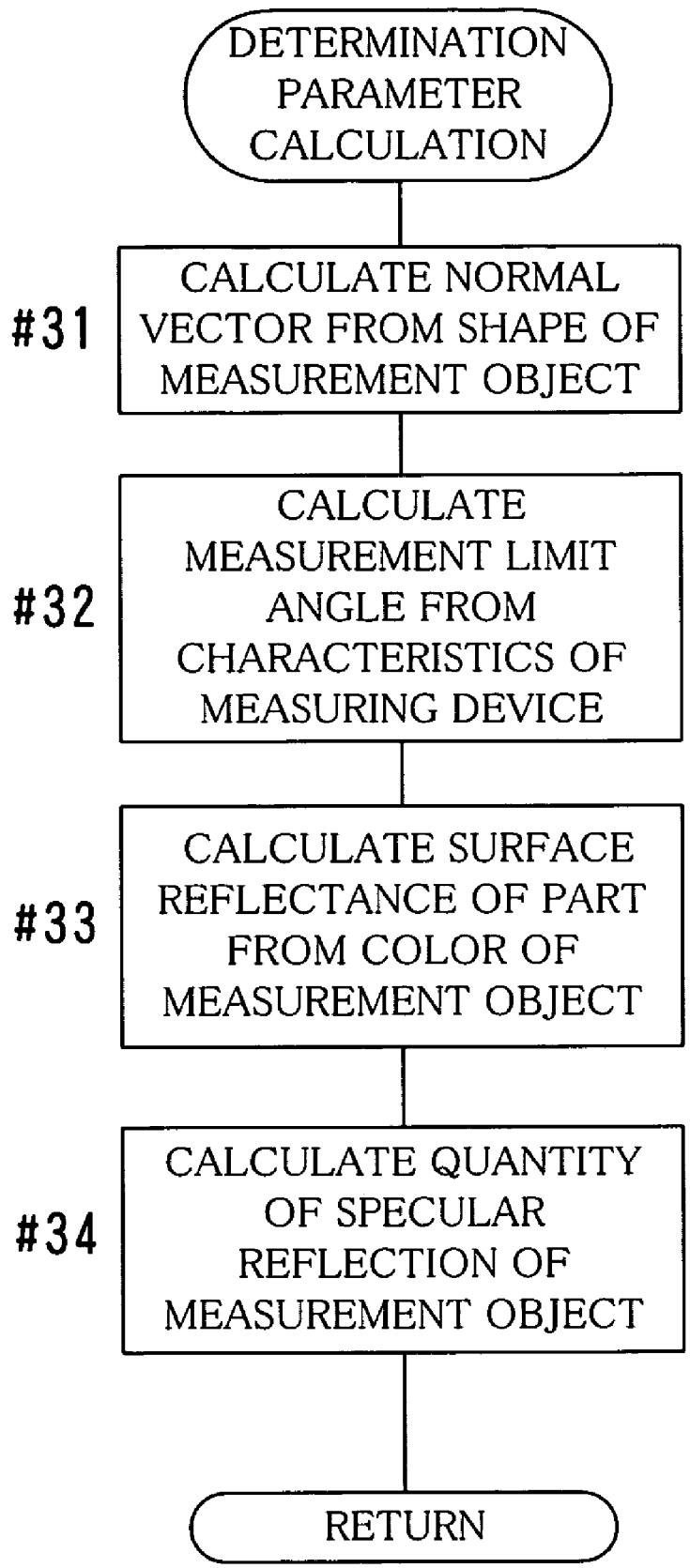
FIG. 4 is a flowchart showing a determination parameter calculating process.
Figure 5:
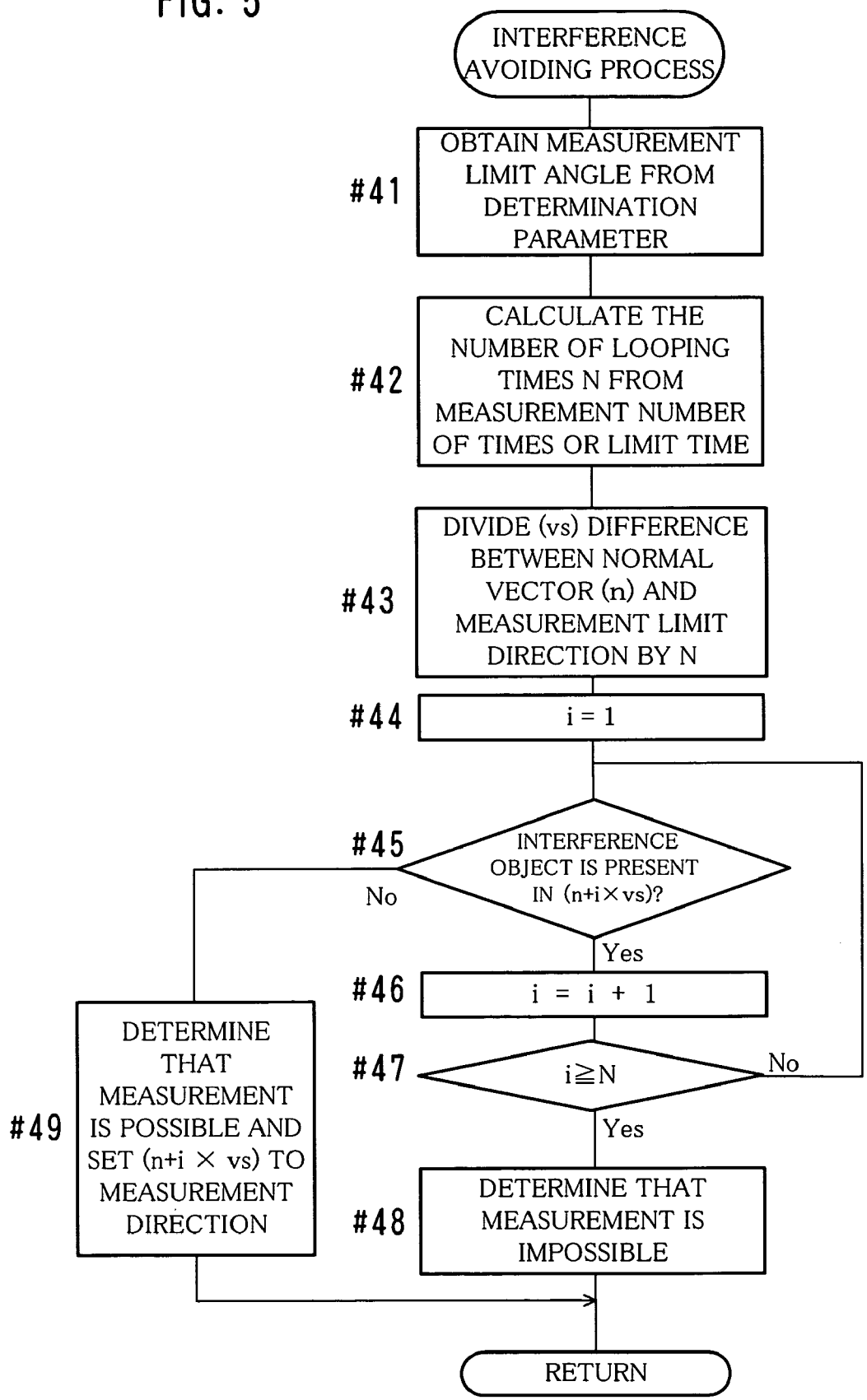
FIG. 5 is a flowchart showing an interference avoiding process.
Figure 6:
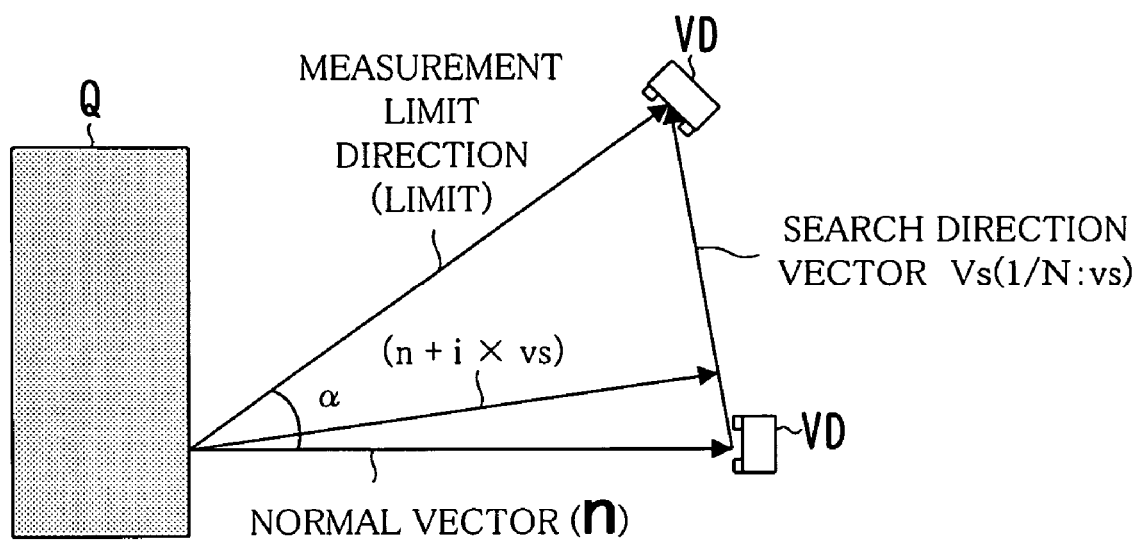
FIG. 6 is a diagram showing a state of an interference avoiding process.
Figure 7:
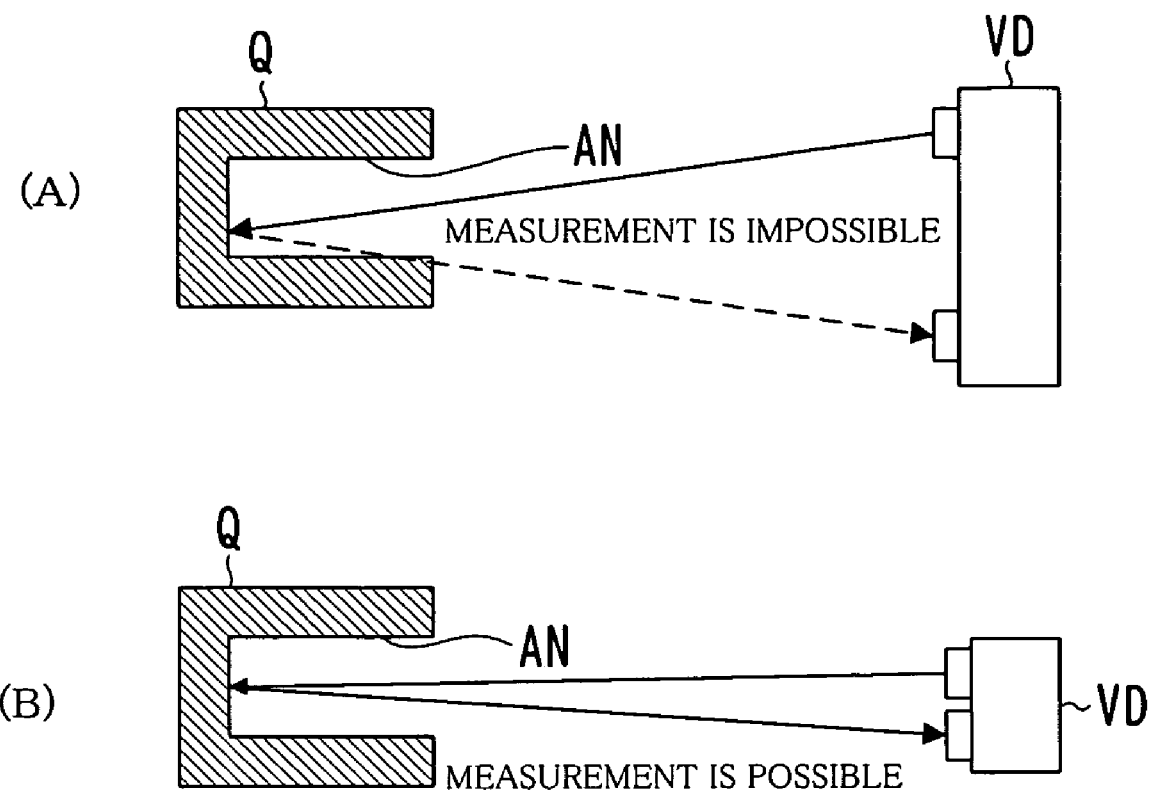
FIGS. 7(A) and 7(B) are diagrams showing an example of determining whether the measurement is possible or not.

FIG. 3 is a flowchart showing a process of determining a part that can be measured by three-dimensional measurement, which is performed by the processing device 11, FIG. 4 is a flowchart showing a determination parameter calculating process, FIG. 5 is a flowchart showing an interference avoiding process, FIG. 6 is a diagram showing a state of an interference avoiding process, and FIGS. 7(A) and 7(B) are diagrams showing an example of determining whether the measurement is possible or not.

The measurable part determining process shown in FIG. 3 is executed for each part of the measurement object Q (for each measurement part BU). Note that each part of the measurement object Q means a primitive (element) of CAD data, for example.

As shown in FIG. 3, the determination parameter calculating process is performed first so that the determination parameter is calculated (#11). Next, measurement direction of the three-dimensional measuring device VD toward the measurement object Q is set to the normal direction with respect to the surface of the measurement object Q (#12). It is determined whether or not the part to be measured on the measurement object Q is the bottom (#13). If the part to be measured is the bottom (Yes in #13), it is determined that the measurement is impossible (#21).

If the part to be measured is other than the bottom (No in #13), it is determined whether or not reflectance HR of the surface of the part is lower than a reference value SV1 in accordance with the characteristics information TJ (#14). If the reflectance HR is lower than the reference value SV1 (Yes in #14), it is determined that the measurement is impossible (#21).

If the reflectance HR is higher than the reference value SV1, it is determined whether or not specular reflectance SR of the same part is higher than a reference value SV2 (#15). If the specular reflectance SR is higher than the reference value SV2 (Yes in #15), it is determined that the measurement is impossible (#21).

Next, it is determined whether or not an interference object exists in the measurement direction of the three-dimensional measuring device VD (#16). If an interference object exists, an interference avoiding process is executed (#18). If the interference object cannot be avoided by the interference avoiding process (No in #19), it is determined that the measurement is impossible (#21).

If there is no interference object (No in #16) or if the interference object can be avoided (Yes in #19), it is determined whether or not tolerance of the part to be measured is within accuracy and resolution of the three-dimensional measuring device VD in accordance with the characteristics information TJ and the specifics information SJ. In other words, it is determined whether or not a size of the part to be measured is within the range of tolerance and whether it can be measured or not within the range of accuracy and resolution of the three-dimensional measuring device VD (#17). If it is yes in the step #17, it is determined that it can be measured (#20).

A determination parameter HP of each part is calculated in the determination parameter calculating process as shown in FIG. 4. The determination parameter HP is, for example, a normal vector of the shape, reflectance HR of the surface, quantity of specular reflection, and a measurement limit angle with respect to the normal vector in a part of the measurement object Q to be measured. Here, it is supposed to calculate the normal vector, the measurement limit angle, the reflectance and the specular reflection.

The normal vector (n) is calculated from shape data of the measurement object Q based on the design shape information KJ (#31). In accordance with the specifics information SJ, base line length information of the three-dimensional measuring device VD, the angle of view and a measurement distance, the measurement limit angle in the normal direction of the measurement object Q is calculated (#32). The surface reflectance of the part is calculated from color of the measurement object Q based on the characteristics information TJ (#33). In this case, it is possible to provide a conversion table between color and reflectance and to read the reflectance or the quantity of received light corresponding to the color of the part based on the characteristics information TJ from the conversion table. In addition, it is also possible to calculate the reflectance or the quantity of received light by using a conversion equation of color and reflectance.

For example, the quantity of received light (intensity of received light) may be determined from spectral intensity of a project light source (laser beam or slit light) of the three-dimensional measuring device VD, spectral reflectance of the measurement object Q, diffusion characteristic, and position relationship of distance and direction between the measurement object Q and the three-dimensional measuring device VD. If the determined quantity of received light is larger than a predetermined value that depends on the specifics information SJ of the three-dimensional measuring device VD, it is determined that the measurement is possible.

Next, an example of calculating the quantity of received light will be described.

Figure 22:
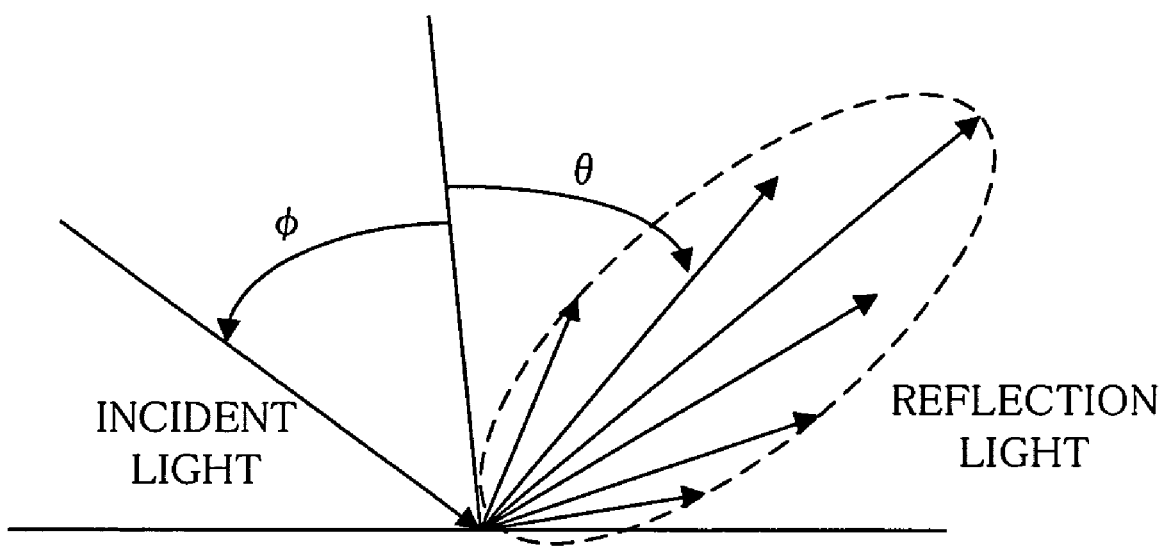
FIG. 22 is a diagram showing a relationship between an incident angle and a reflection angle with respect to the measurement object.

First, the measurement part BU of the measurement object Q is set to be a sample, and diffusion reflection characteristic on the surface of the sample is represented by $f(\theta,\phi)$. Here, $\phi$ is an incident angle of incident light (project light) to the sample surface, and $\theta$ is reflection angle of reflection light on the sample surface. The angles $\theta$ and $\phi$ are shown in FIG. 22.

The spectral reflectance characteristic of the sample surface is represented by $\rho(\lambda)$. Here, it is supposed that the spectral reflectance characteristic depends on a material of the sample as simplification.

Concerning characteristics of a light projecting portion (source) of the three-dimensional measuring device VD, relative spectral distribution is represented by $s(\lambda)$ and the relative intensity is represented by P. In addition, spectral responsivity characteristic of a light receiving portion (detector) is represented by D(λ). A distance between the light receiving portion and the sample is represented by d. If the light source of the light projecting portion is a laser, attenuation due to a distance d between the light source and the sample can be neglected. Considering only distance attenuation of the reflection light, the quantity of received light A(φ, θ) is expressed by the equation (1) below.

$$A(\varphi, \theta) = \frac{k}{d^2} \int_\lambda \rho \cdot s(\lambda) \cdot f(\theta, \varphi) \cdot \rho(\lambda) \cdot d\lambda \quad (1)$$

Here, k is a constant.

Figure 23:
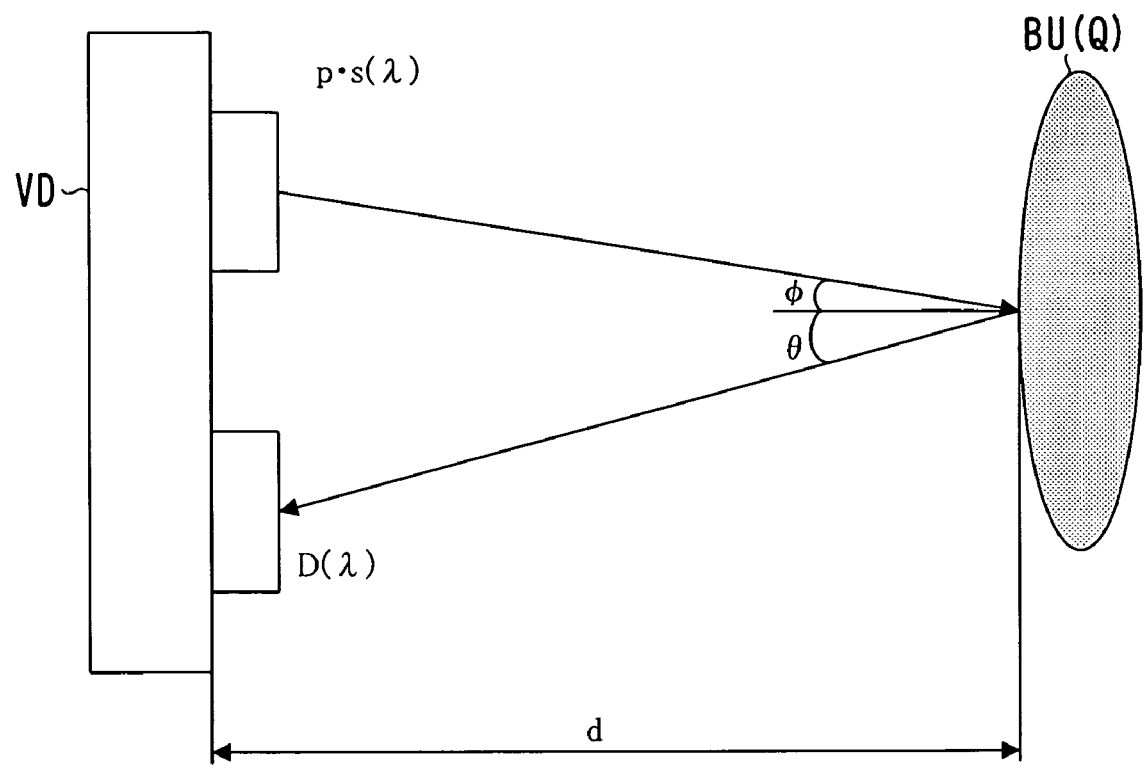
FIG. 23 is a diagram showing a positioning relationship between the measurement object and the three-dimensional measuring device.

Arrangement relationship between the sample and the three-dimensional measuring device VD is shown in FIG. 23. The quantity of received light A(φ, θ) can be calculated from these relationships.

In the practical embodiment, P, s(λ) and D(λ) are determined as functions of the device. Therefore, f(θ, φ) and ρ(λ) are measured for obtaining data about various types of samples (materials and surface states), and a database may be generated. In other words, when the measurement allowance of the measurement object Q to be the sample is determined in advance, φ, θ and d are determined by the position relationship between the arrangement (distance) of the light projecting portion and the light receiving portion of the three-dimensional measuring device VD and the measurement part BU of the measurement object Q in the position relationship between the three-dimensional measuring device VD to be evaluated and the measurement object Q. Therefore, the quantity of received light A(φ, θ) can be estimated by using data of ρ(λ) that are determined in advance in accordance with a material of the sample.

With reference to FIG. 4 again, quantity of specular reflection of the measurement object Q is determined by equalizing the incident angle to the reflection angle in the equation (1). Therefore, the quantity of specular reflection is calculated based on this (#34).

Note that the quantity of specular reflection can be calculated in accordance with surface roughness of the measurement object Q. In this case, it is possible to use a conversion table between the surface roughness and the quantity of specular reflection or a conversion equation. The surface roughness can be expressed by various parameter values defined by JIS, a triangle mark or other parameters. The diffusion characteristic of the surface may be affected responding to the surface roughness.

Note that it is possible for the operator to enter manually the reflectance and the quantity of specular reflection on the surface of the measurement object Q.

In addition, the dead angle of the three-dimensional measuring device VD indicates that there is an interference part in the measurement direction although the three-dimensional measuring device VD can be arranged. As a method for determining the dead angle, it is possible to calculate a laser vector (a projection light vector) and a line of sight vector (direction in which the reception light element sees the position) from optical information of the three-dimensional measuring device VD, e.g., ejection position of the laser beam that is the measurement light source, a center of lens, a position of the reception light element and the like. If there is a part other than the part to be measured on these two vectors, it is determined to be the dead angle.

With reference to FIGS. 5 and 6, the measurement limit angle α is obtained from the determination parameter HP first (#41). According to the measurement limit angle α, a measurement limit direction that is slanted from the normal direction by the measurement limit angle α is obtained. The number of looping times N is determined from the measurement allowable number of times KK or the measurement allowable time KT (#42).

A search direction vector (Vs) that indicates a difference between the normal vector (n) and the measurement limit direction (LIMIT) is divided by N, which makes a vector vs (#43). The vector vs is a differential vector of one search for avoiding interference. Every time when the differential vector vs is added to the normal vector (n), the measurement direction vector to be checked is obtained.

Therefore, a variable i is set to "1" initially (#44), and the following loop is repeated until the variable i becomes N or more or the interference object disappears (#45-49). In other words, it is determined whether or not an interference object or an interfering part exists in the measurement direction vector (n+i×vs) (#45). If the interference object exists, the variable i is incremented (#46), which is repeated until the variable i reaches N (#47). If it is not the dead angle of the three-dimensional measuring device VD and if the position of the three-dimensional measuring device VD have no interfering part, the loop is stopped, and the measurement direction vector (n+i×vs) at that time is fixed as the measurement direction.

In this way, it is determined whether or not three-dimensional measurement of each part of the measurement object Q is possible, and the measurement direction is determined if the three-dimensional measurement is possible. Since the determined measurement direction is closest to the normal direction, it is also an optimal measurement direction, i.e., an optimal measurement condition.

As shown in FIGS. 7(A) and 7(B), it is supposed that there are two three-dimensional measuring devices VD1 and VD2 having different base line lengths. If the three-dimensional measuring device VD1 having a long base line is used for measurement as shown in FIG. 7(A), a hole AN cannot be measured because of interference by another part. In contrast, if the three-dimensional measuring device VD2 having a short base line is used for measurement as shown in FIG. 7(B), the hole AN can be measured to its bottom. In this way, plural pieces of specifics information SJ of plural three-dimensional measuring devices VD are obtained and stored in the instrument specifics information storing portion 24, so that the three-dimensional measuring device VD to be used can be selected in accordance with a shape and dimensions of the part of the measurement object Q, such as dimensions or a shape of the hole AN. Thus, it is possible to perform more accurate measurement in shorter time period.

Next, an example of a method for determining priorities will be described in the case where plural three-dimensional measuring devices VD exist. For example, it is supposed that there are two three-dimensional measuring devices VD1 and VD2, i.e., a first one and a second one. In this case, the first three-dimensional measuring device VD1 is used first for determining the measurement allowance, and the determination result is saved. Next, the second three-dimensional measuring device VD2 is used for determining the measurement allowance. Then, if the part (area) that was determined to be a part that could be measured by the second three-dimensional measuring device VD2 is already determined to be a part that can be measured by the first three-dimensional measuring device VD1, measurable areas of them for one measurement time are compared so that a three-dimensional measuring device having a larger measurable area is selected to be used. If the measurable areas are the same, a three-dimensional measuring device VD having higher measurement accuracy is selected to be used. Note that the measurable area can be calculated from an angle of view or depth of field that are obtained from the specifics information SJ.

Next, a method of determining the measurement condition SC will be described sequentially. The measurement condition SC includes a measurement position of the three-dimensional measuring device VD and a posture of the three-dimensional measuring device VD.

(1) Determine the measurement allowance of all three-dimensional measuring devices VD.

(2) Obtain measurable area in the same three-dimensional measuring device VD, prepare measurement condition set information corresponding to the area, and set the same to "pending measurement condition".

(3) Extract one candidate point that did not pass the interference avoiding process when the measurement allowance was determined, from measurable areas in which the measurement condition set information is "pending measurement condition" (hereinafter referred to as an "unset area").

(4) Detect an optimal measurement condition for the extracted candidate point.

(5) Detect a peripheral area that is measured under the measurement condition.

(6) Output the measurement condition when the unset area included in the peripheral area becomes larger than a threshold value, and go back to the above (3) after setting "measurement condition has been set" in the measurement condition set information for the area that is measured by the measurement condition. If the unset area is the threshold value or less, i.e., if it is less than a constant area value, an optimal measurement condition and an area value of the peripheral area in the condition are calculated for neighboring points of the candidate point, so as to go back to the above (4) after making a maximum point a new candidate point. Note that a value that is inversely proportional to the number of outputted measurement conditions can be set as the threshold value. If the set area increases, the case where the threshold value is not satisfied may occur frequently.

(7) If "measurement condition has been set" is set in the measurement condition set information of all measurable areas, the process is finished. Note that an ID of the measurement condition corresponding to the measurement condition set information is also provided. The ID when "measurement condition has been set" is set first has higher priority.

Next, a method for displaying allowance or refusal of the measurement will be described.

(1) If plural display devices 12 are used, one of them displays the measurement allowance information including the measurable part KB and the non-measurable part HB in different colors. In this case, it is also displayed which one of plural three-dimensional measuring devices VD is used. Another display device 12 displays a result of the real measurement by the three-dimensional measuring device VD.

Thus, the operator can see the measurable part KB and the non-measurable part HB in advance. Therefore, when the operator performs the measurement manually, preparation thereof can be easy. In addition, it is not necessary to make vain efforts for measurement of the non-measurable part HB, so that measurement time can be shortened. In addition, it becomes clear how much extent the measurement object Q has been measured, so that measurement time can be further shortened.

Furthermore, if one display device 12 displays multi windows instead of using plural display devices 12, the same effect can be obtained.

(2) If plural three-dimensional measuring devices VD having different characteristics are available, which three-dimensional measuring device VD should be used for each part and further whether or not the part cannot be measured by any three-dimensional measuring device VD are displayed in different colors. In addition, they are indicated by a character message or a graphic display. Thus, the measurement can be performed efficiently.

Next, concrete examples will be described. According to the first through the fifth examples, an operator performs the real measurement by manual using the three-dimensional measuring device VD, while it is performed automatically in the sixth example using the manipulator 16. However, regardless of this, the present invention can be applied to either the manual or the automatic measurement.

FIRST EXAMPLE

Figure 8:
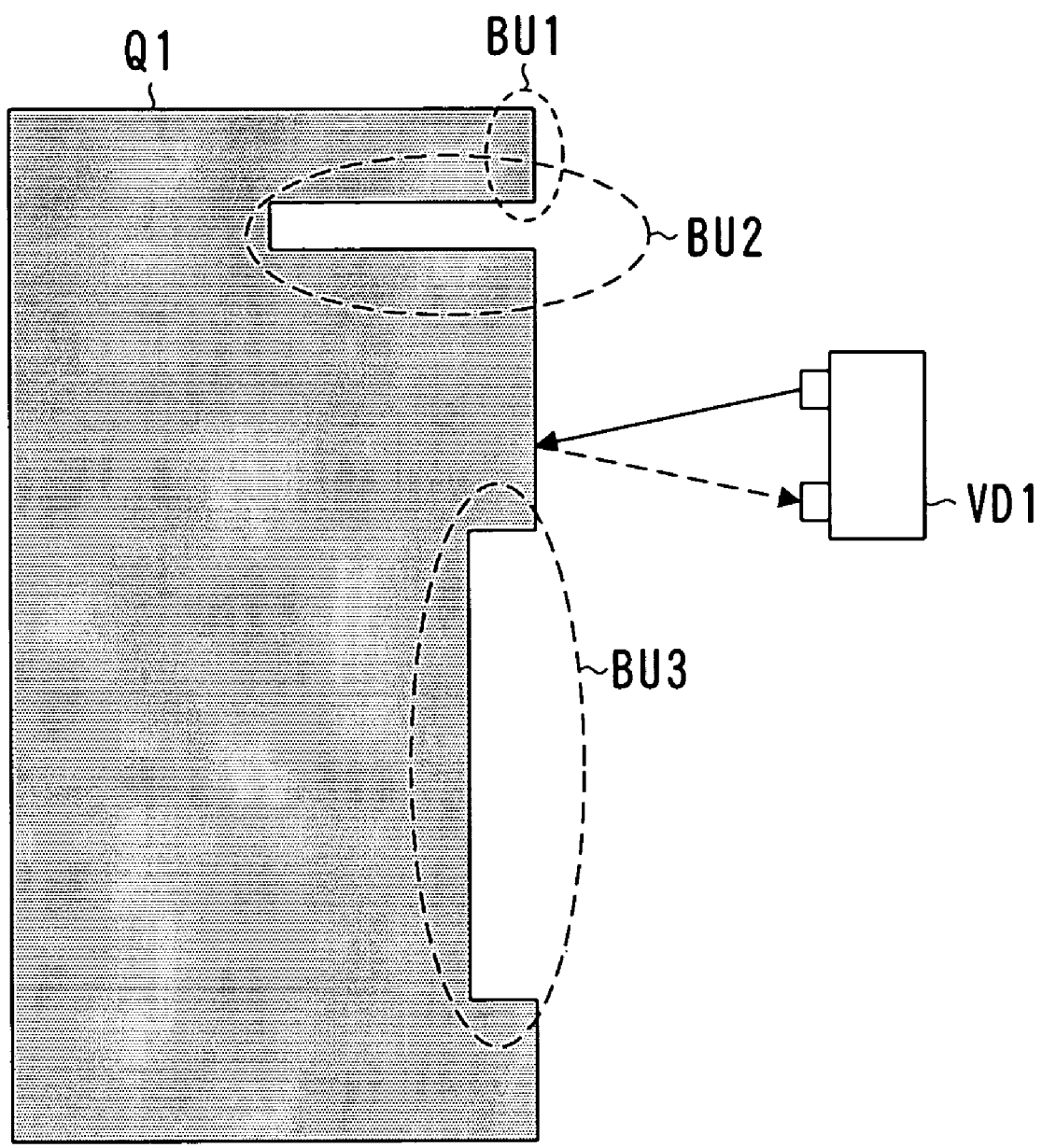
FIG. 8 is a diagram showing a shape of a measurement object that is used in a first example.
Figure 9:
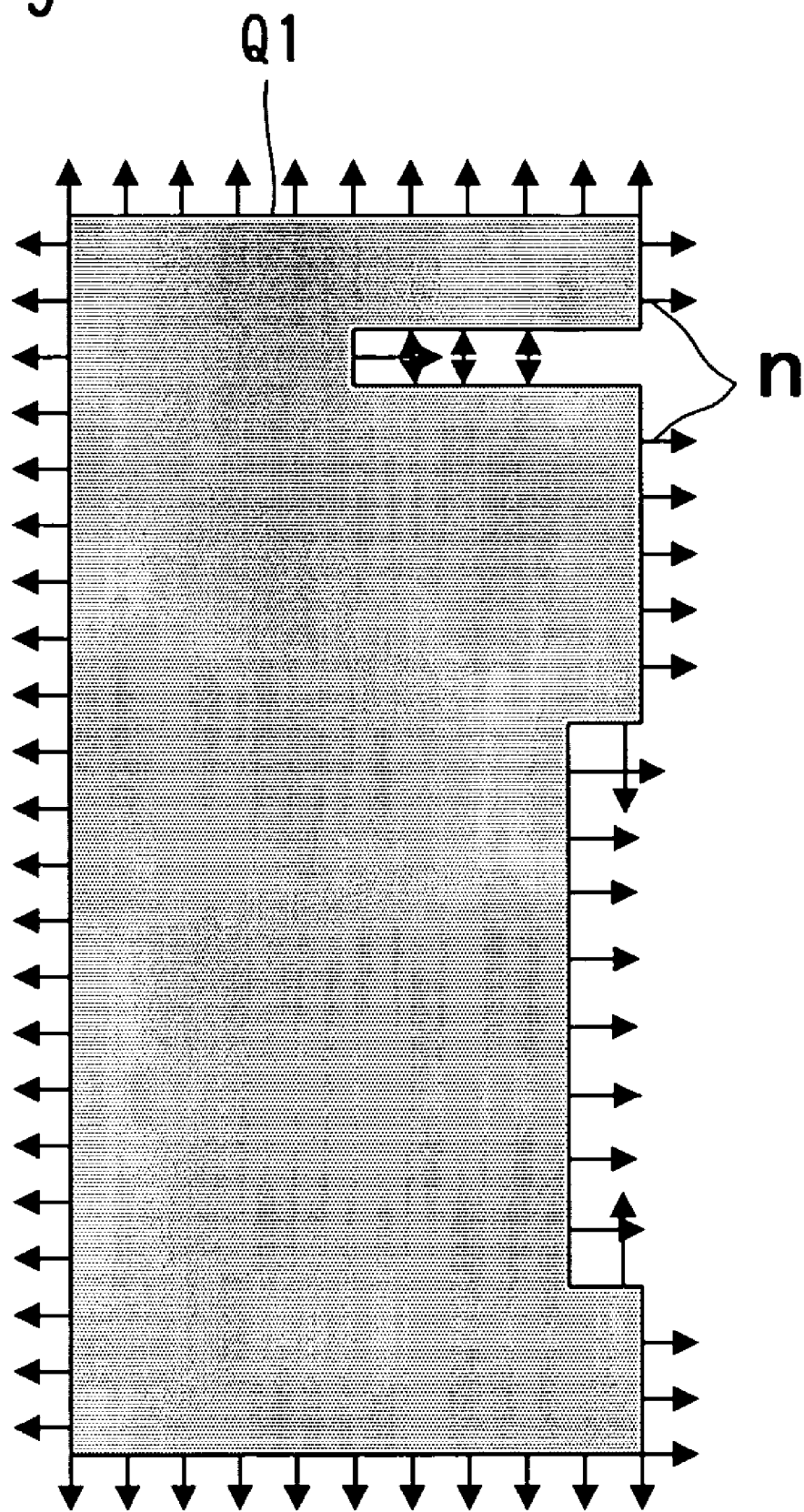
FIG. 9 is a diagram showing normal vectors of the measurement object.
Figure 10:
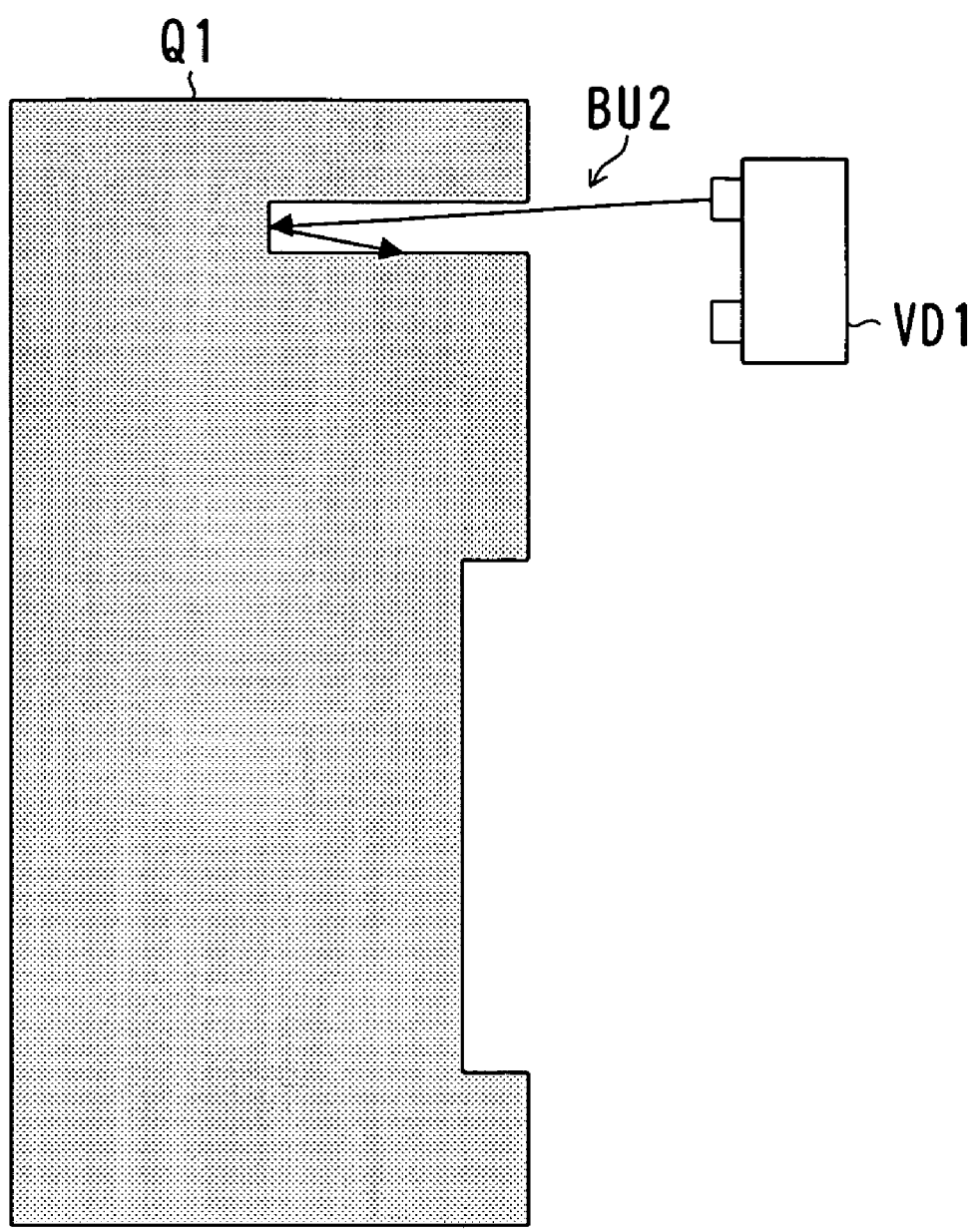
FIG. 10 is a diagram showing a state of determining whether or not a measurement part BU2 that is a hole can be measured.
Figure 11:
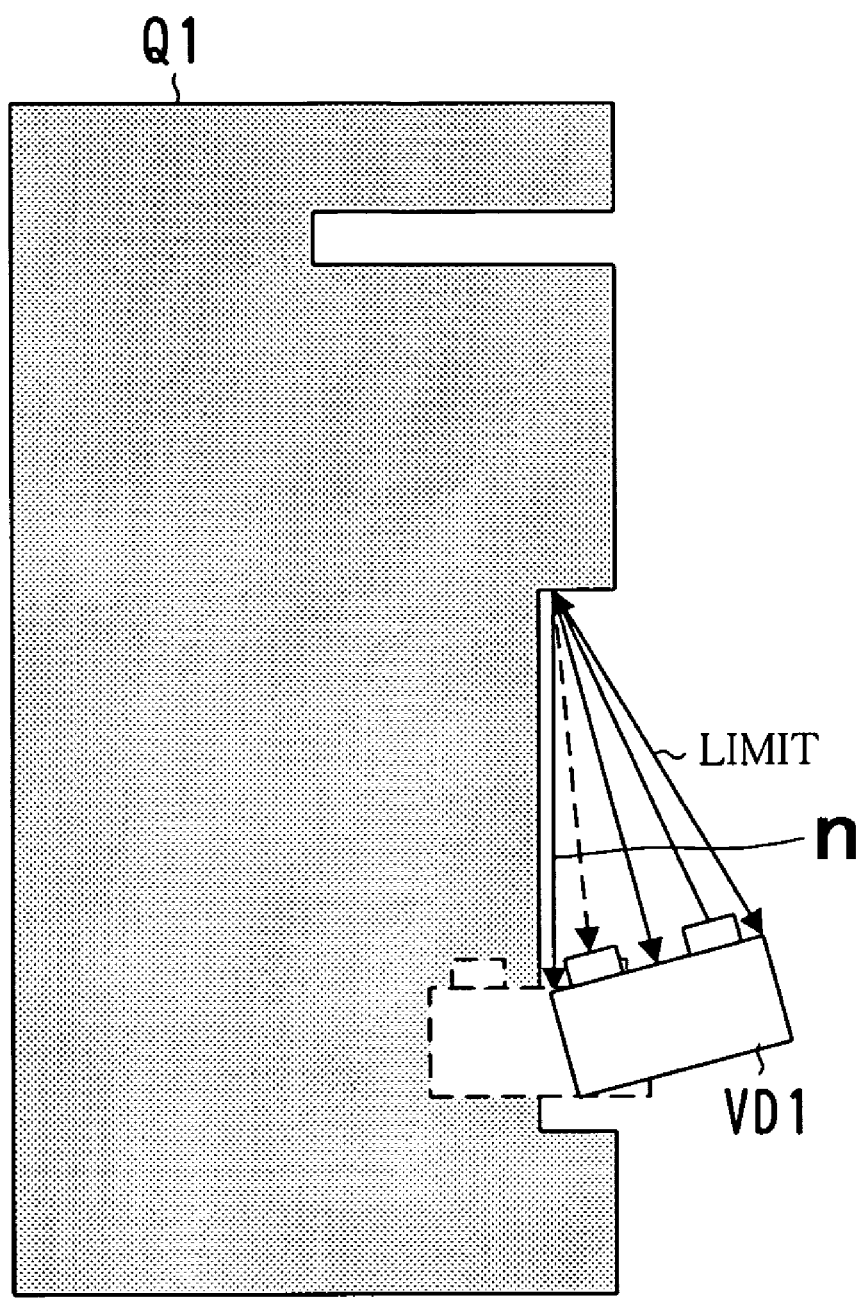
FIG. 11 is a diagram showing a state of determining whether or not a measurement part BU3 that is a hole can be measured.
Figure 12:
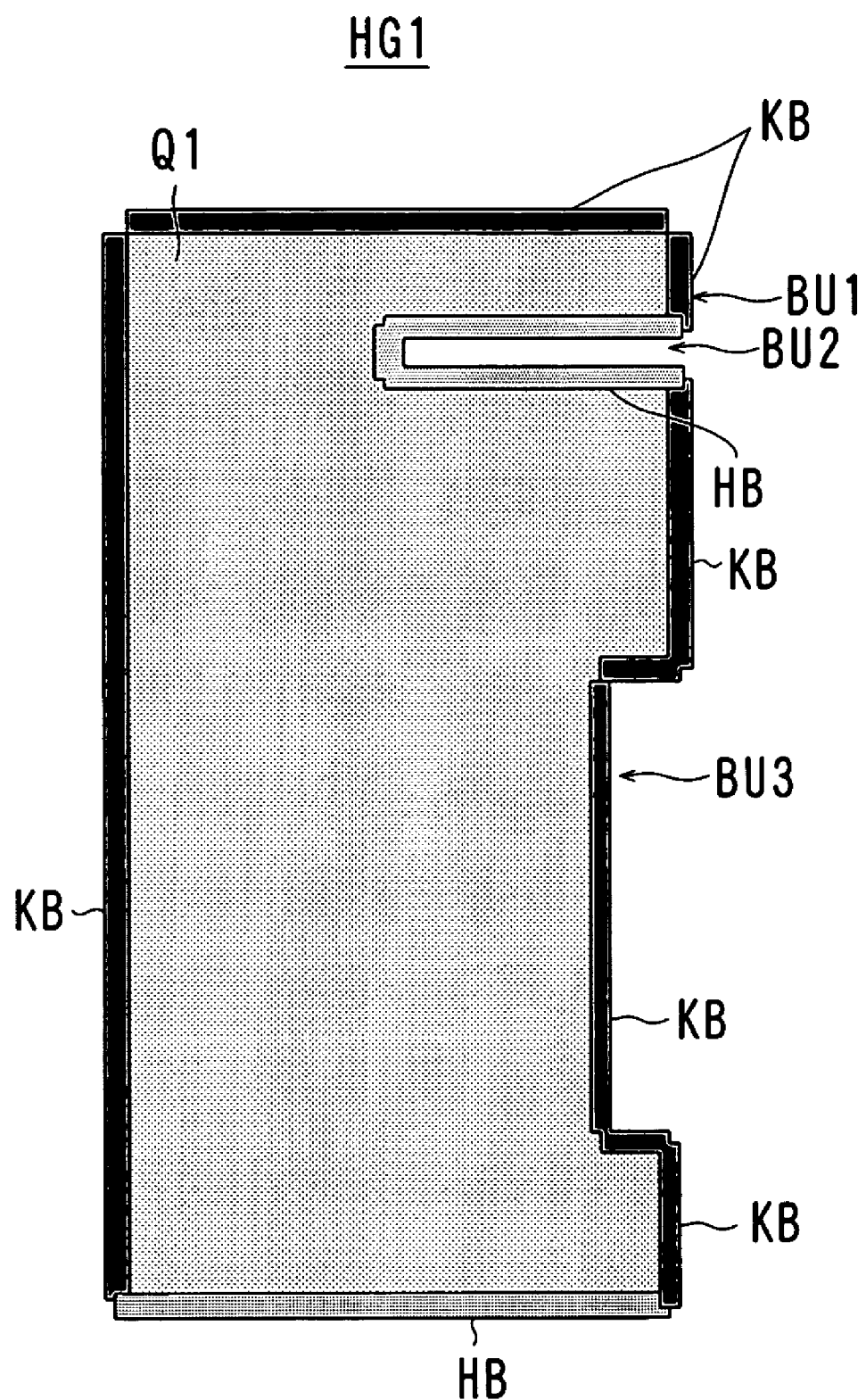
FIG. 12 is a diagram showing a measurement allowance determining picture about the measurement object.

FIG. 8 is a diagram showing a shape of a measurement object Q1 that is used in a first example, FIG. 9 is a diagram showing normal vectors of the measurement object Q1, FIG. 10 is a diagram showing a state of determining whether or not a measurement part BU2 that is a hole can be measured, FIG. 11 is a diagram showing a state of determining whether or not a measurement part BU3 that is a hole can be measured, and FIG. 12 is a diagram showing a measurement allowance determining picture HG1 in which a measurement allowance determination result about the measurement object Q1 is displayed.

In the first example, for simplifying description, the shape of the measurement object Q1 is displayed in a two-dimensional manner. It is the same for other examples.

As shown in FIG. 8, measurement parts BU1, BU2, BU3 . . . are shown on the measurement object Q1. Among these, the measurement parts BU2 and BU3 are holes AN.

One three-dimensional measuring device VD1 is used for the measurement. Concerning the three-dimensional measuring device VD1 that is used, obtained specifics information SJ is as follows.

The resolution is 0.1 mm, the accuracy is 0.1 mm, and the measurement distance is 600 mm. If the specular reflection is 80% or more, the measurement is impossible. If the reflectance is 10% or more with respect to the measurement light source, the measurement is possible. Dimensions of the three-dimensional measuring device VD1. As the optical information, the base line length: 250 mm, the center of the lens, the light source position, the angle of view: 32 mm×240 mm. Color of the projection light source is red.

The design shape information KJ of the measurement object Q1 is obtained from the three-dimensional CAD data, for example or from master shape data obtained by the measurement using the three-dimensional measuring device.

In addition, characteristics information TJ of the measurement object Q1 is as follows.

Color is white with reflectance of 80%. Surface finishing that is considered to cause diffusion reflection by surface roughness. Tolerance is 0.2 mm in all parts.

These pieces of characteristics information TJ are obtained from the three-dimensional CAD data or entered by the operator manually in advance.

First, the determination parameter HP is calculated. As the determination parameter HP, a normal vector is determined. In FIG. 9, the normal vector is shown by an arrow.

The measurement limit angle $\alpha$ is calculated in accordance with the specifics information SJ of the three-dimensional measuring device VD1. In this example, the measurement limit angle $\alpha$ is calculated to be 45 degrees from the resolution, the angle of view, the base line length and the measurement distance. Since color of the measurement object Q1 is white with 80% and color of the projection light source is red color, the reflectance is calculated to be 80%. From surface roughness of the measurement object Q1, it is calculated to be diffusion reflection.

Thus, the calculation of the determination parameter HP is finished, and then determination of the measurement allowance is performed.

First, it is determined that the bottom cannot be measured. Next, when the measurement is started from the upper right portion of the measurement object Q1, the measurement part BU1 shown in FIG. 8 is determined to be the measurable part KB by the reasons described below.

(1) It is not in the dead angle of the three-dimensional measuring device VD1.

(2) A part that interferes in the measurement direction (normal direction) does not exist.

(3) A part that interferes in the arrangement position of the three-dimensional measuring device VD1 does not exist.

(4) The reflection of the measurement object Q1 is higher than the reference value (10%).

(5) The specular reflection is lower than the reference value (specular reflection 80%), which means diffusion reflection.

(6) The resolution (0.1 mm) and the accuracy (0.1 mm) are satisfied with respect to the tolerance (0.2 mm). Note that the measurement can be performed if each of a resolution value and an accuracy value is a half of the tolerance value, usually.

Furthermore, a part other than the measurement parts BU2 and BU3 that are holes can be determined to be measurable parts KB by a similar determination. Hereinafter, measurement allowance determination for the measurement parts BU2 and BU3 that are holes will be described.

As shown in FIG. 10, concerning the measurement part BU2 that is a hole, it is decided that both the side surface and the bottom are the non-measurable part HB because they become dead angles of the three-dimensional measuring device VD1 in any arrangement of the three-dimensional measuring device VD1.

Next, as shown in FIG. 11, the measurement allowance determination is performed for the measurement part BU3 that is a hole.

The measurement part BU3 is determined to be the measurable part KB because of the following reasons.

(1) It is not in a dead angle of the three-dimensional measuring device VD1.

(2) A part that interferes in the measurement direction (normal direction) does not exist.

(3) A part that interferes in the arrangement position of the three-dimensional measuring device VD1 does not exist.

(4) The reflection of the measurement object Q1 is higher than the reference value (10%).

(5) The specular reflection is lower than the reference value (specular reflection cannot be realized), which means diffusion reflection.

(6) The resolution (0.1 mm) and the accuracy (0.1 mm) are satisfied with respect to the tolerance (0.2 mm).

Concerning the measurement part BU3, in an ideal arrangement of the three-dimensional measuring device VD1, the three-dimensional measuring device VD1 is interfered with another part of the measurement object Q1. Therefore, the allowance or refusal of measurement is determined by the interference avoiding process.

In other words, as shown in FIG. 11, a position of the three-dimensional measuring device VD1 is searched within 45 degrees from the normal direction (n) to the measurement limit direction (LIMIT). As a result, it is found that there is no interference part and the measurement can be performed, so it is decided that the side surface can also measured.

The determination result and the like are outputted from the measurement allowance output portion 27 and the measurement condition output portion 28. As shown in FIG. 12, the measurable part KB and the non-measurable part HB of the measurement object Q1 are displayed on the screen of the display device 12 in accordance with the outputted determination result.

In FIG. 12, the measurable part KB and the non-measurable part HB are displayed with different colors in the measurement allowance determining picture HG1. In this case, the measurable part KB is displayed with blue color while the non-measurable part HB is displayed with red color, for example.

The operator can easily discriminate a part that can be measured by the three-dimensional measuring device VD1 from a part that cannot be measured by the same when viewing the measurement allowance determining picture HG1, so that measurement time can be shortened.

SECOND EXAMPLE

Next, a second example will be described that is a case where the three-dimensional measuring device VD1 that is supposed in the above first example and another three-dimensional measuring device VD2 are used for calculating the measurable area of the measurement object Q1 shown in FIG. 8.

Figure 13:
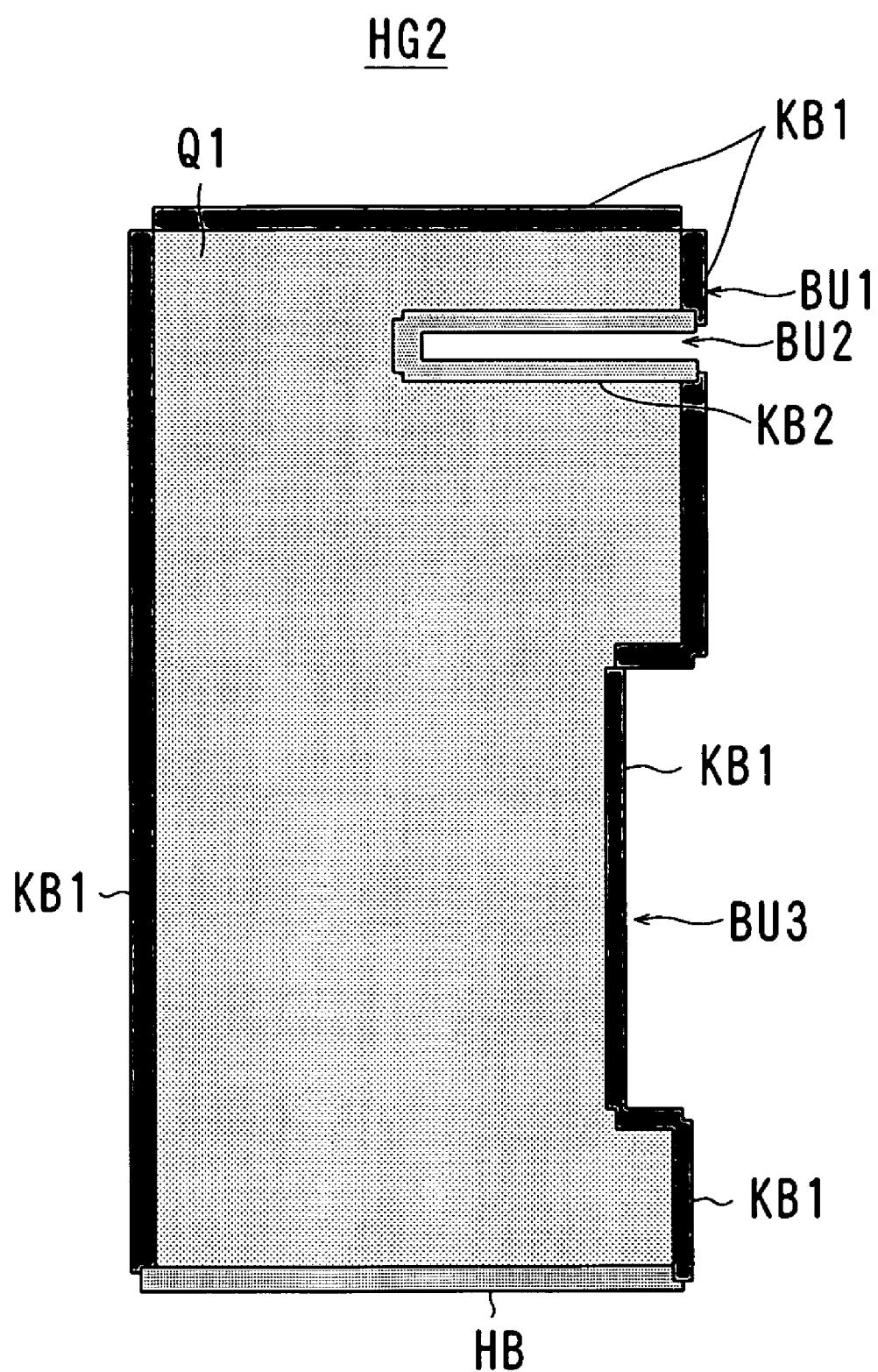
FIG. 13 is a diagram showing another measurement allowance determining picture about the measurement object.

FIG. 13 is a diagram showing another measurement allowance determining picture HG2 about the measurement object Q1.

The specifics information SJ of the three-dimensional measuring device VD2 is as follows.

The resolution is 0.1 mm. The accuracy is 0.15 mm. The measurement distance is 600 mm. If the specular reflectance is 80% or more, the measurement is impossible. If the reflectance for the measurement light source is 10% or more, the measurement is possible. Dimensions of the three-dimensional measuring device VD2. As the optical information, the base line length: 50 mm, the center of the lens, the light source position, the angle of view: 80 mm×60 mm. Color of the projection light source is red.

First, the bottom of the measurement object Q1 is determined to be not measurable. Next, the measurement parts BU1 and BU3 of the measurement object Q1 are measured by the three-dimensional measuring device VD1 in the same method as the first example. Concerning the three-dimensional measuring device VD2, it is determined to be the measurable part KB by similar determination. Therefore, higher priority is put on the measurement by the three-dimensional measuring device VD1 that has larger angle of view in accordance with the above-described "method of determining priority".

Concerning the measurement part BU2 that is a hole, both the side surface and the bottom become dead angles when the three-dimensional measuring device VD1 is used in any arrangement of the three-dimensional measuring device VD1 similarly to the first example. Therefore, it is determined to be impossible to measure them.

However, if the three-dimensional measuring device VD2 is used, the base line length thereof is short. Therefore, the hole part does not become a dead angle as shown in FIG. 7(B) and can be measured.

As described above, if the two three-dimensional measuring devices VD1 and VD2 are used, the entire surface of the measurement object Q1 except the bottom can be measured.

As shown in FIG. 13, the measurable part KB and the non-measurable part HB of the measurement object Q1 are displayed on the screen of the display device 12. In addition, it is shown which one of the three-dimensional measuring devices VD1 and VD2 should be used for measuring the measurable part KB.

In FIG. 13, measurement allowance determining picture HG2 displays the measurable part KB1 that can be measured by the three-dimensional measuring device VD1, the measurable part KB2 that can be measured by the three-dimensional measuring device VD2 and the non-measurable part HB in different colors. In this case, the measurable part KB1 is displayed in blue color, the measurable part KB2 in green color and the non-measurable part HB in red color, for example.

THIRD EXAMPLE

Next, a third example will be described as a case where one three-dimensional measuring device VD1 is used and a type of its lens is exchanged so as to change its specification. Here, a case will be described, in which an angle of view and accuracy are changed by exchanging lenses. A lens having a wide angle of view is referred to as a "wide angle lens", and a lens having a narrow angle of view is referred to as a "telephoto lens" in the following description.

The resolution and the accuracy are respectively 0.2 mm and 0.2 mm for the wide angle lens, while they are respectively 0.05 mm and 0 mm for the telephoto lens. Other specifics information SJ is the same as the first example.

Figure 14:
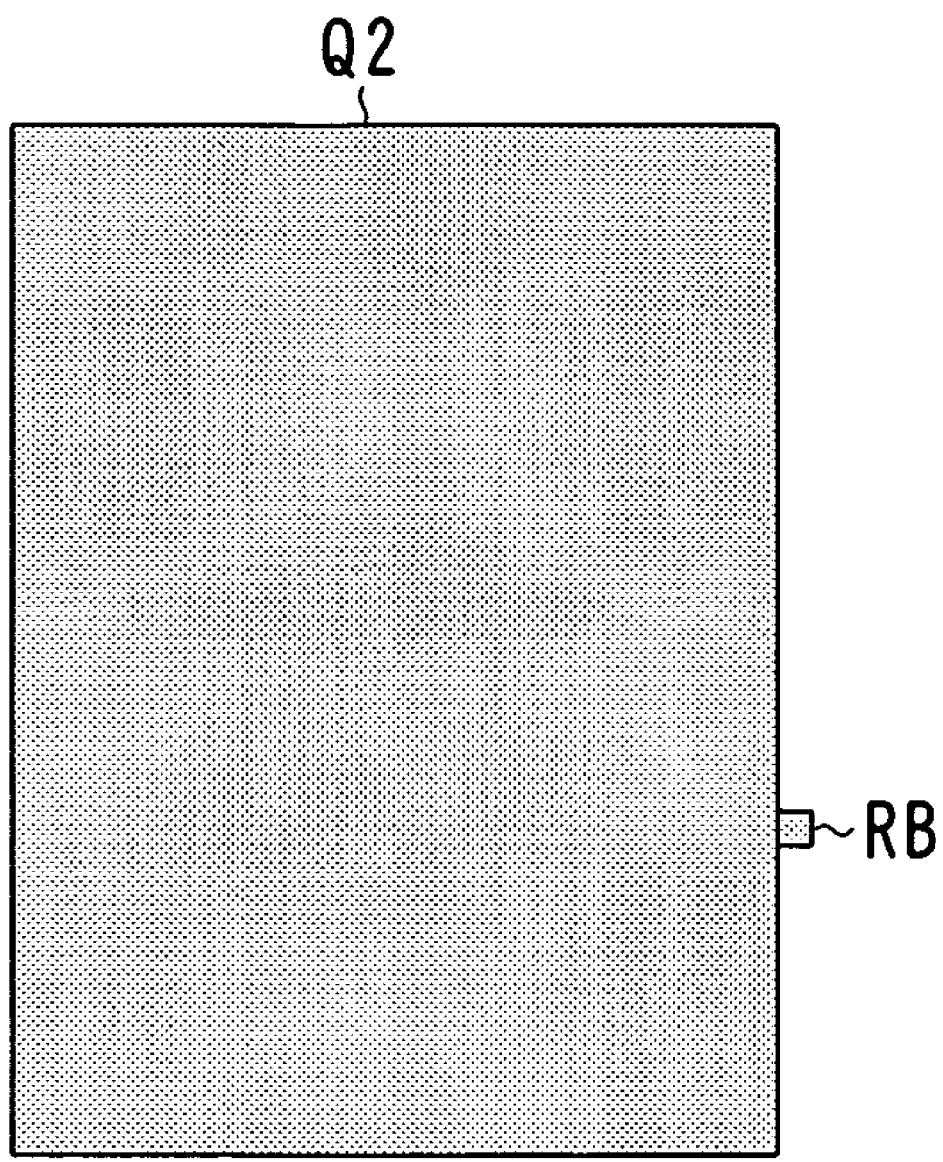
FIG. 14 is a diagram showing the measurement object that is used for a third example.
Figure 15:
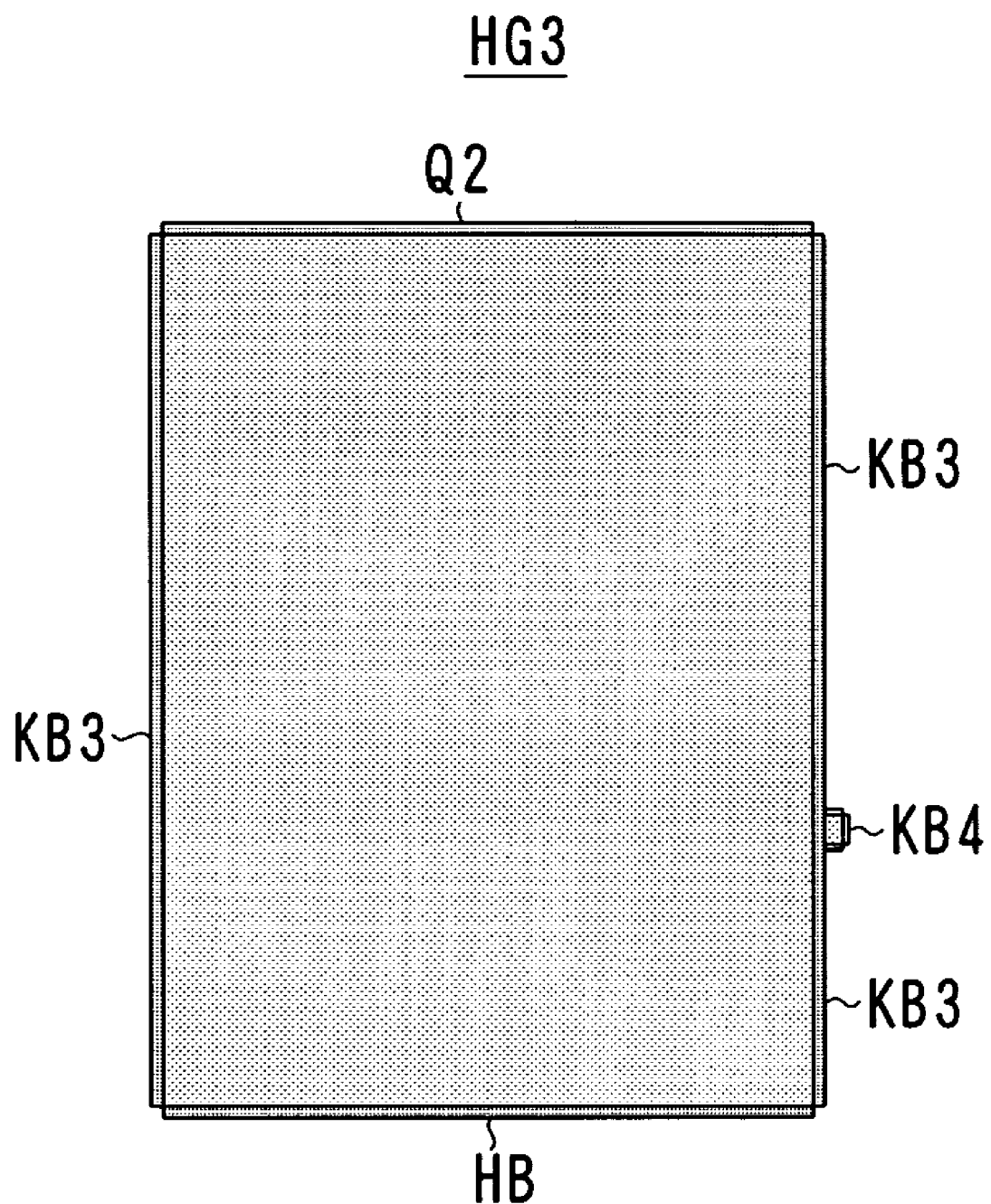
FIG. 15 is a diagram showing another measurement allowance determining picture about the measurement object.

FIG. 14 is a diagram showing a measurement object Q2 that is used for a third example, and FIG. 15 is a diagram showing another measurement allowance determining picture HG3 about the measurement object Q2.

As shown in FIG. 14, the measurement object Q2 has a small rib RB protruding from one side of the rectangular section. The characteristics information TJ of the measurement object Q2 includes tolerance values of the measurement parts BU, which are 0.5 mm without designation and 0.1 mm at the part of the rib RB. Other characteristics are the same as the first example.

The angle of view is 400×320 mm for the wide angle lens and is 100×80 mm for the telephoto lens.

First, the bottom of the measurement object Q2 is determined to be a non-measurable part. Next, it is determined to be measurable in determination of interference and a surface state by determining a shape of the measurement object Q2. Concerning the part of the rib RB, tolerance that is set for the measurement object Q2 is 0.1 mm, while accuracy and resolution of the measurement device are 0.2 mm for the wide angle lens. Since the accuracy and the resolution are not sufficient, it is determined that the measurement by the wide angle lens is not possible. If the telephoto lens is used, accuracy and resolution are 0.05 mm with respect to tolerance of 0.1 mm. Therefore, it is determined that the measurement is possible.

Although the measurement is possible using either the wide angle lens or the telephoto lens for other parts, the wide angle lens having a larger area per measurement will be used for the measurement in accordance with the "method for determining priority".

In this way, the telephoto lens is used only for the part of the rib RB, and the wide angle lens is used for other parts. Thus, a measurement result that can stand up for the tolerance determination can be obtained.

As shown in FIG. 15, the measurable part KB3 using the wide angle lens is shown in blue color and measurable part KB4 using the telephoto lens is shown in green color in the measurement allowance determining picture HG3 for the measurement object Q2.

FOURTH EXAMPLE

Next, a fourth example will be described as a case where specular reflection occurs or surface color varies depending on the measurement part BU.

Figure 16:
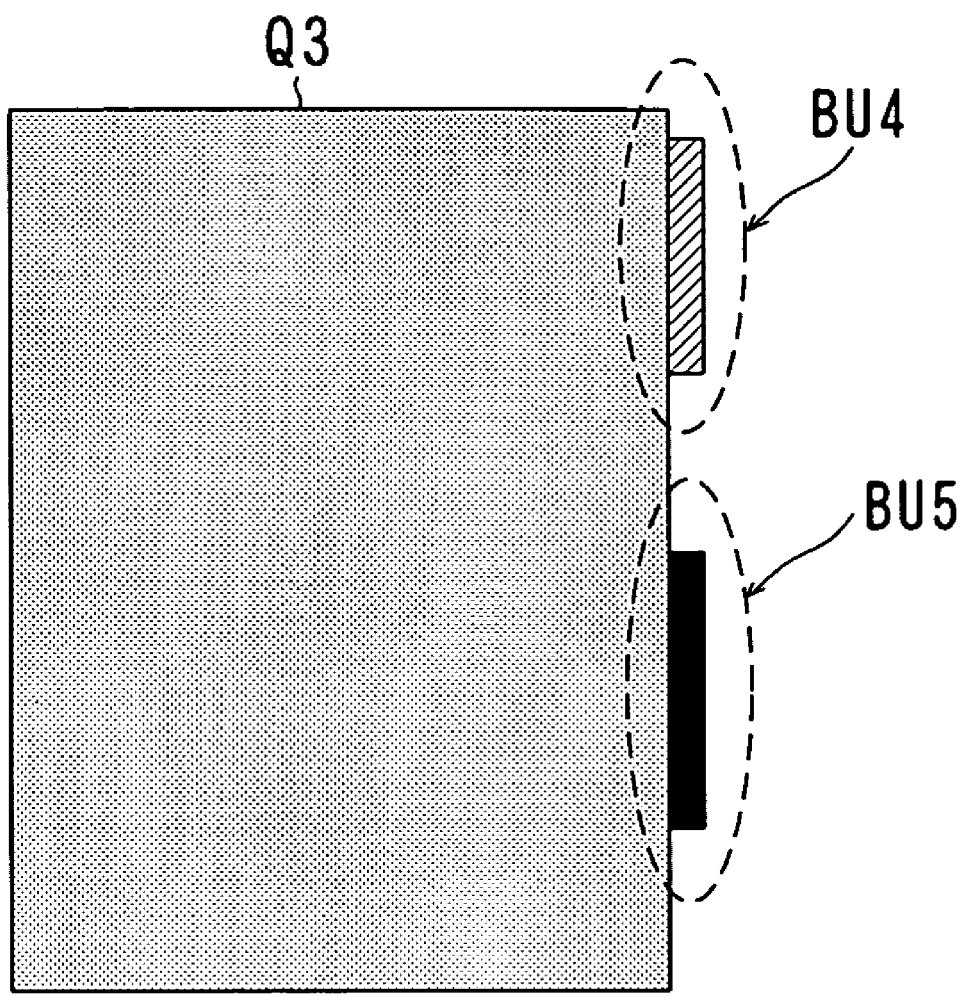
FIG. 16 is a diagram showing the measurement object that is used for a fourth example.
Figure 17:
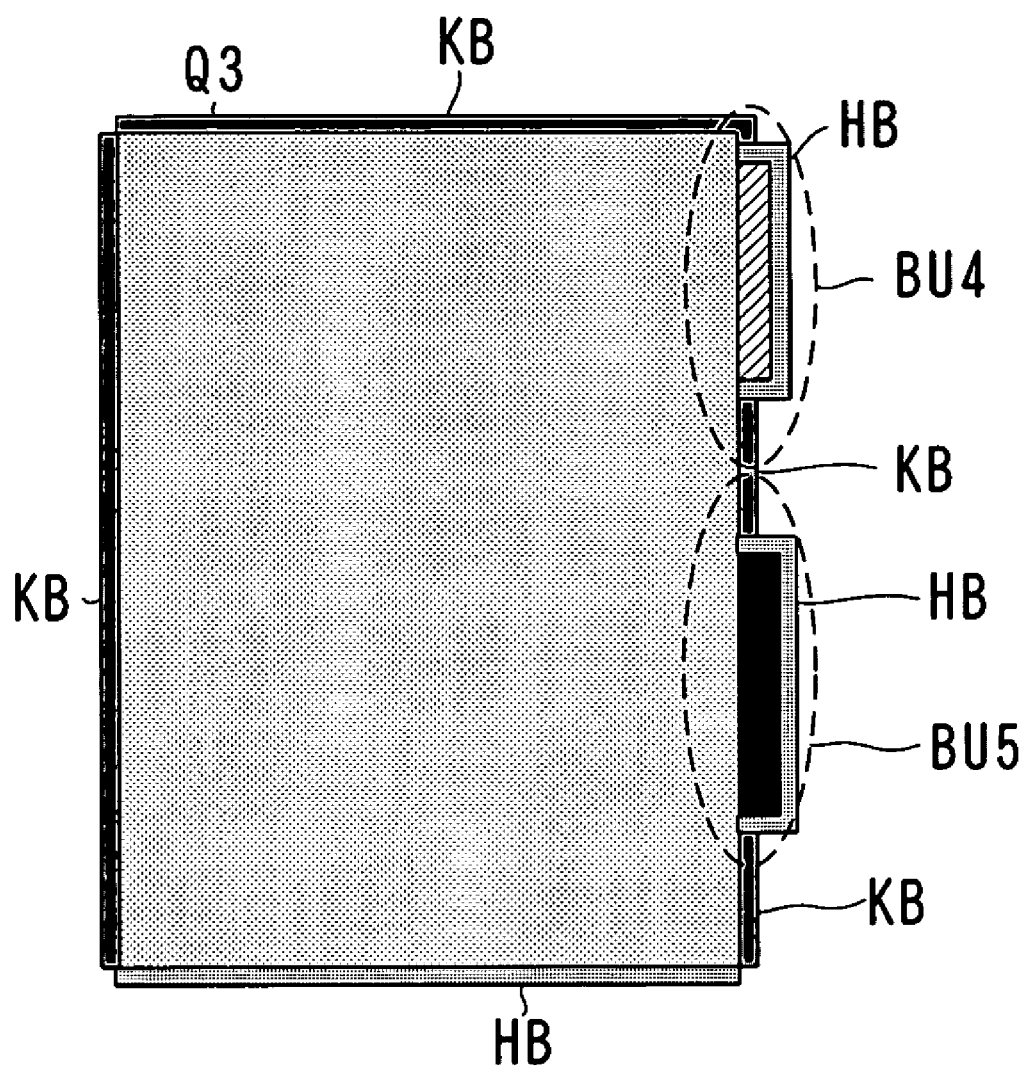
FIG. 17 is a diagram showing another measurement allowance determining picture about the measurement object.

FIG. 16 is a diagram showing a measurement object Q3 that is used for a fourth example, and FIG. 17 is a diagram showing a measurement allowance determining picture HG4 about the measurement object Q3.

The specifics information SJ of the three-dimensional measuring device VD1 is the same as the first example. The characteristics information TJ of the measurement object Q3 is basically the same as the first example but is different in the following point.

The measurement part BU4 has the specular reflection (with specular reflectance 95%), and the measurement part BU5 has surface color of black (with reflectance 5%).

First, the bottom is determined to be non-measurable part. Concerning the measurement part BU4, it is determined that the measurement is not possible in the determination of the specular reflection. In other words, the three-dimensional measuring device VD1 cannot make measurements if the specular reflectance is 80% or more. Concerning the measurement part BU5, it is determined that the measurement is not possible in the reflectance determination. It is because the reflectance is 5% although the three-dimensional measuring device VD1 can make measurements when the reflectance is 10% or more. Concerning other measurement part BU, it is determined that the measurement is possible because all conditions are satisfied, which includes reflectance, specular reflection quantity, no interference and accuracy.

As shown in FIG. 17, the measurable part KB is shown in blue color and the non-measurable part HB in red color, for example, in the measurement allowance determining picture HG4 for the measurement object Q3.

FIFTH EXAMPLE

Next, a fifth example will be described as a case where the measurement allowable number of times KK is used for determination.

Figure 18:
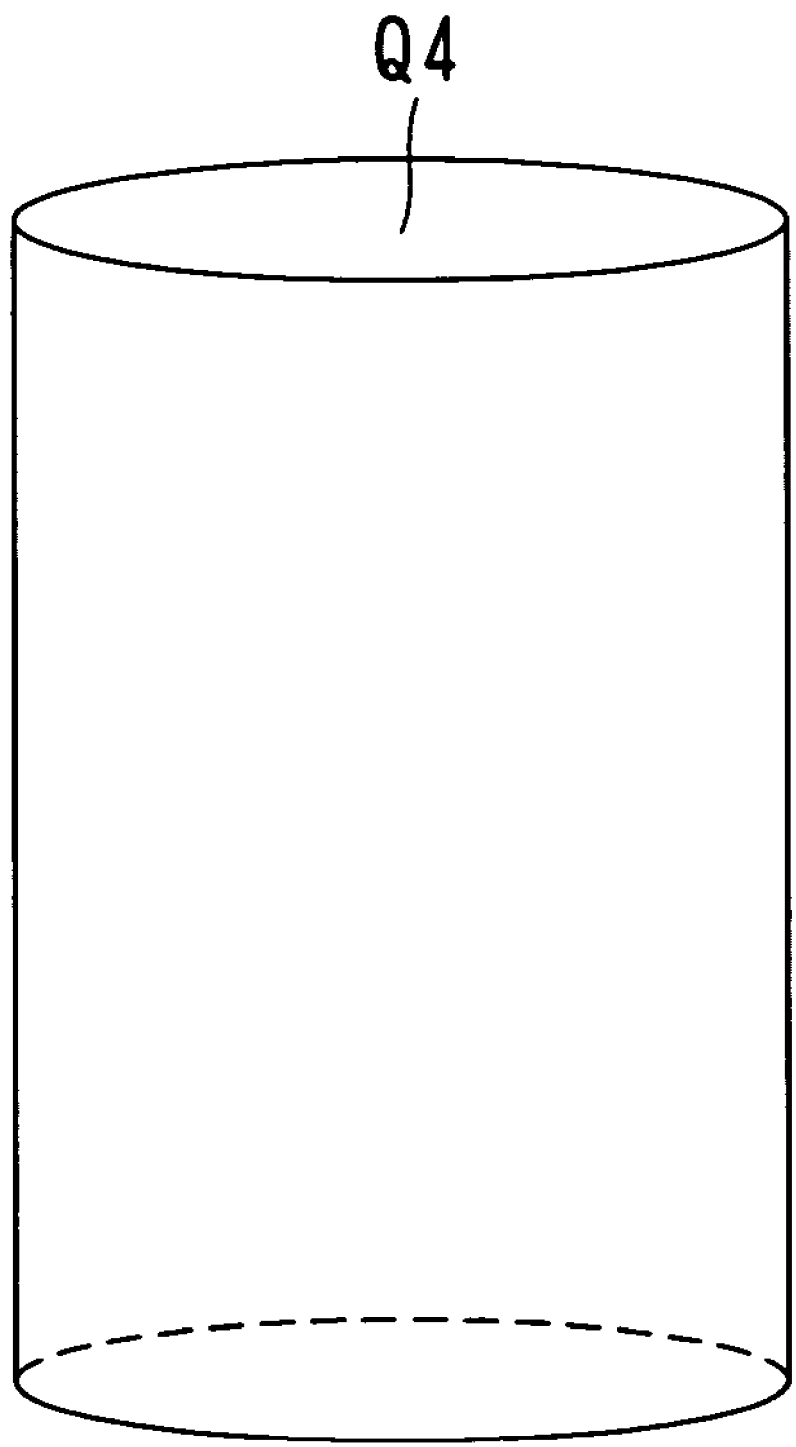
FIG. 18 is a diagram showing the measurement object that is used for a fifth example.
Figure 19:
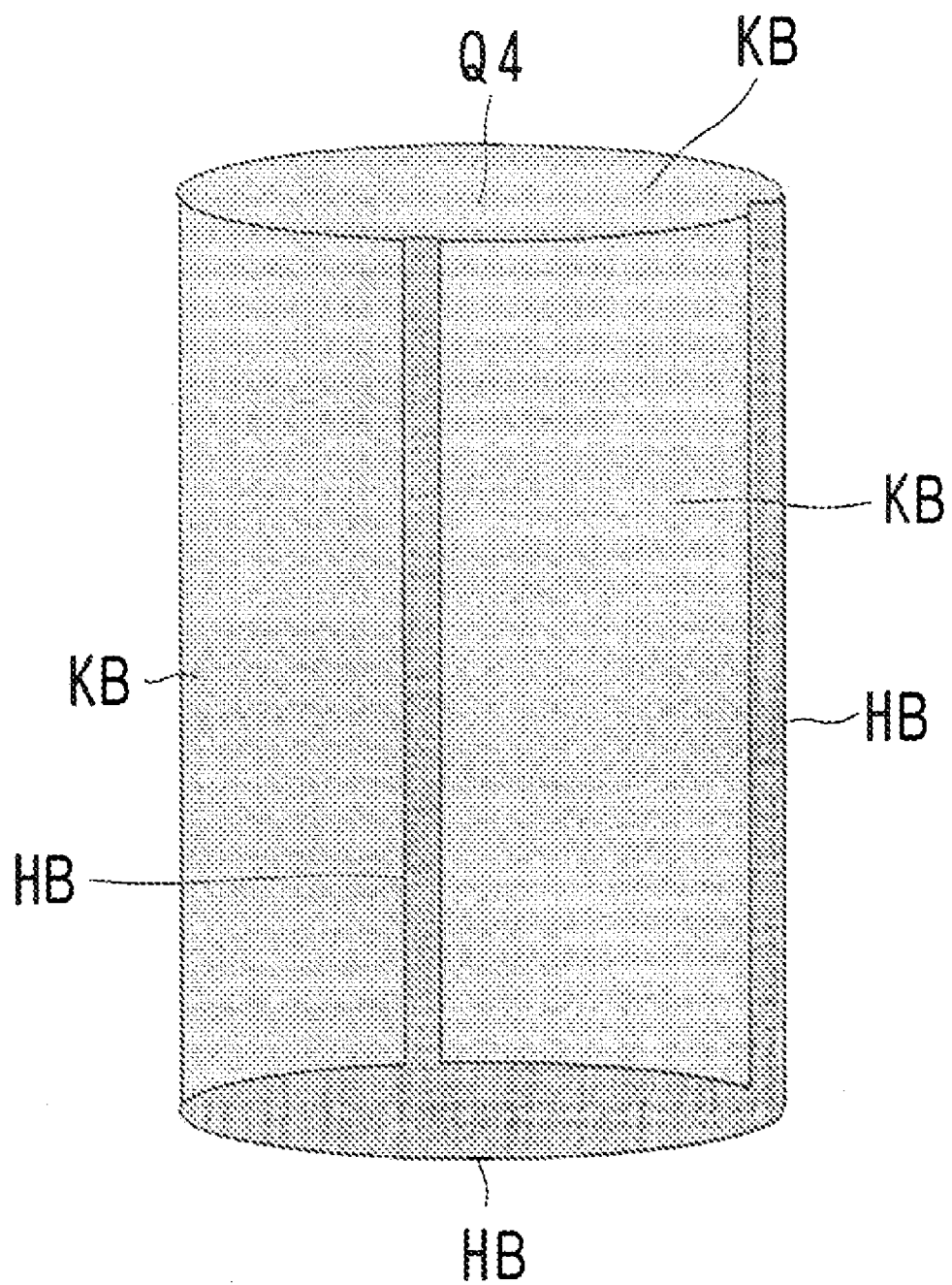
FIG. 19 is a diagram showing another measurement allowance determining picture about the measurement object.

FIG. 18 is a diagram showing a measurement object Q4 that is used for a fifth example, and FIG. 19 is a diagram showing another measurement allowance determining picture HG5 about the measurement object Q4.

The specifics information SJ of the three-dimensional measuring device VD1 is the same as the first example. A shape of the measurement object Q3 is a cylindrical column shape as shown in FIG. 18, and the characteristics information TJ is basically the same as the first example.

In accordance with the design shape information KJ or the like, presence or absence of interference, a state of a surface and the like are determined, so that it is determined that the measurement is possible for them. Concerning the measurement object Q4, eight times of measurement from the lateral direction and one time of measurement from the upper direction that are nine times of measurement in total are necessary in order to obtain continuous three-dimensional shape data SD of the side surface and the upper surface of the cylindrical column.

Here, a case where an operator designates seven times as the measurement allowable number of times KK will be described. If the measurement allowable number of times KK is designated as seven times, an arrangement of the three-dimensional measuring device VD1 is calculated so that an overall surface shape except the bottom of the measurement object Q4 can be obtained to a certain extent by the measurement of seven times, and thereby a measurable area is outputted. More specifically, the process is performed in the following procedure.

(1) Perform the measurement allowance determination. In this case, every surface except the bottom can be measured.

(2) Output the measurable area information.

(3) Perform calculation about the measurement condition, and sort measurable areas in the descending order of the measurement area per measurement in accordance with the obtained measurement condition. The calculation of the measurement condition is performed in accordance with the method of determining the measurement condition SC described above.

(4) Determine a measurement condition that makes the area value of the measurement area the maximum within the range of the measurement allowable number of times KK.

(5) Output the measurable area corresponding to the determined measurement condition as the final measurable part KB.

If the measurement allowable time KT is set instead of the measurement allowable number of times KK, the measurement allowable number of times KK may be determined at a rough estimate in accordance with time necessary for one measurement by the three-dimensional measuring device VD1, and then a process similar to the above-described process may be performed.

As shown in FIG. 19, a part of the bottom and the side surface is displayed as the non-measurable part HB in the measurement allowance determining picture HG5 for the measurement object Q4, and other parts are displayed as the measurable part KB. In other words, since the measurement allowable number of times KK is set to seven times, data deficit may be generated in a part of the side surface.

In this case, if the operator selects to put a priority on the measurement allowable number of times KK, a position and a posture of the three-dimensional measuring device VD1 is determined for the measurement in accordance with the measurable part KB that is displayed in the measurement allowance determining picture HG5 although some data are lost. In addition, if the operator selects to measure without data deficit, for example, if the operator resets the measurement allowable number of times KK to nine times, the process is performed again in accordance with the changed measurement allowable number of times KK. In this case, all surfaces of the measurement object Q4 except the bottom become the measurable part KB.

SIXTH EXAMPLE

Next, a sixth example will be described as a case where the manipulator 16 is used for automatic measurement.

Figure 20:
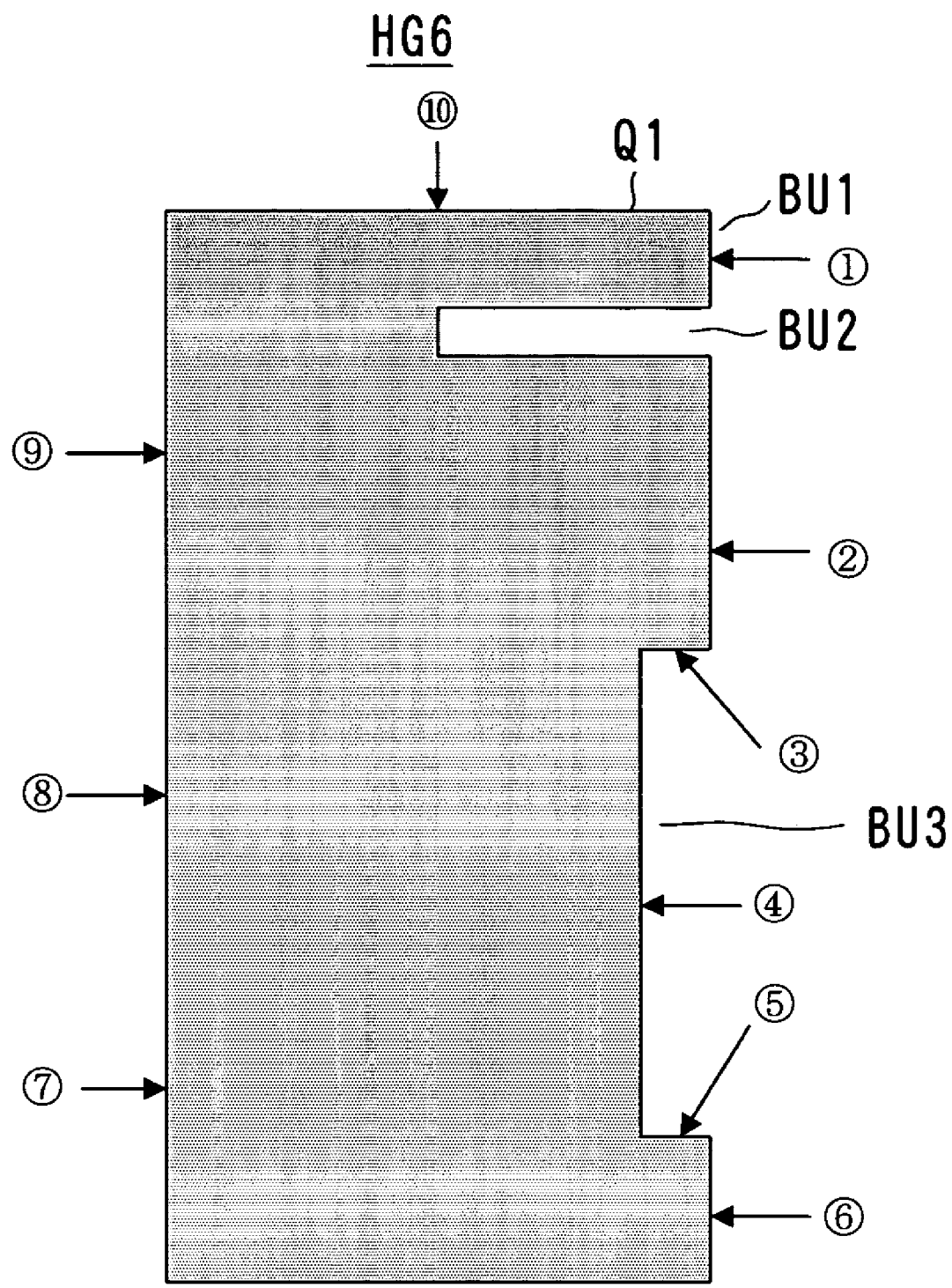
FIG. 20 is a diagram showing a measurement procedure picture that is displayed in a sixth example.
Figure 21:
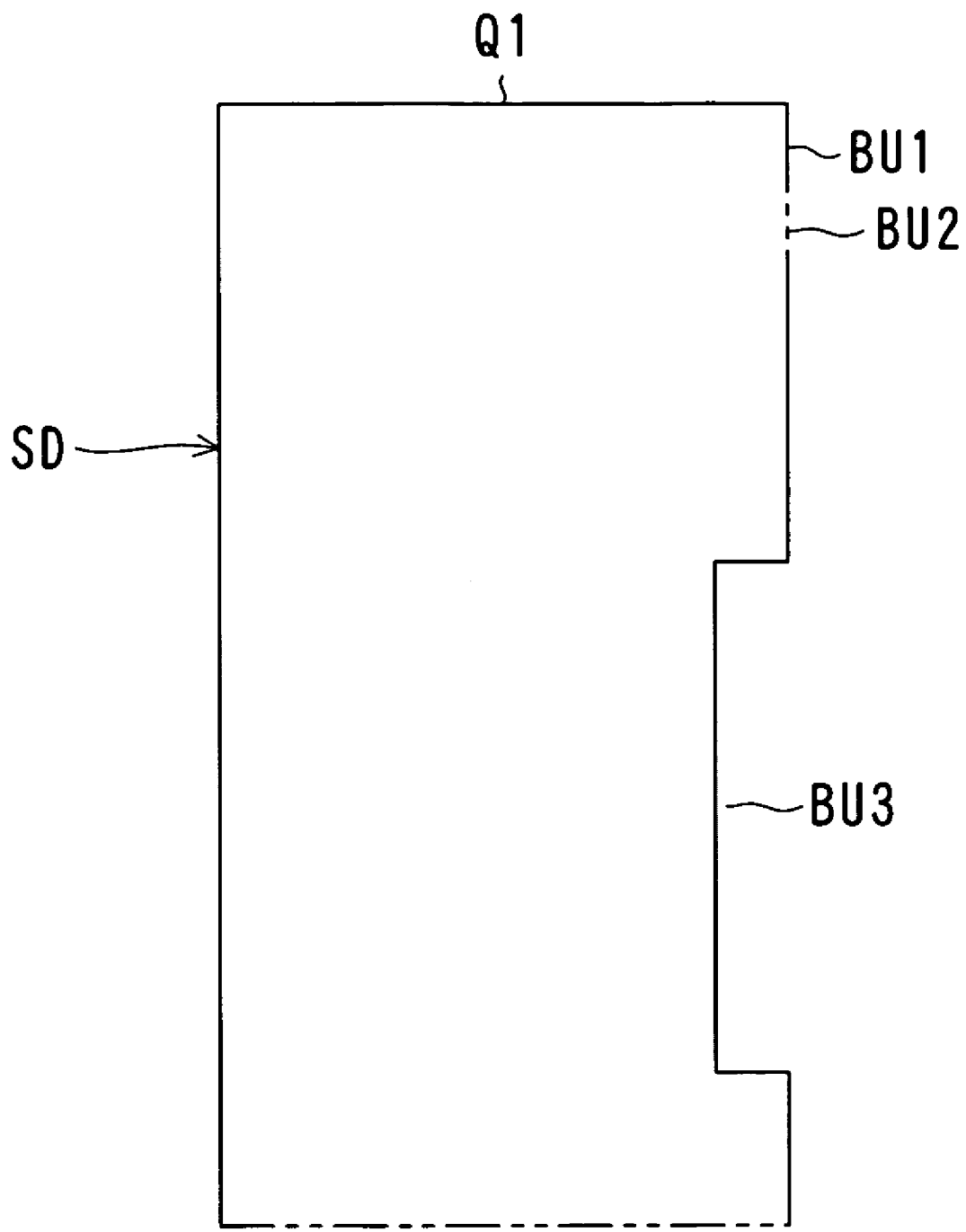
FIG. 21 is a diagram showing three-dimensional shape data obtained by automatic measurement.

FIG. 20 is a diagram showing a measurement procedure picture HG6 that is displayed in a sixth example, and FIG. 21 is a diagram showing three-dimensional shape data SD obtained and integrated by automatic measurement.

The specifics information SJ and the measurement object Q1 of the three-dimensional measuring device VD1 are the same as the first example. Therefore, the bottom of the measurement object Q1 and the measurement part BU2 that is a hole are the non-measurable part HB.

The measurement condition is calculated in accordance with the method of determining the measurement condition SC described above. The measurement orders for measurement parts BU of the measurement object Q1 are determined so that a movement distance of the three-dimensional measuring device VD1 becomes small for shortening the measurement time in accordance with the obtained measurement condition. In FIG. 20, circled numerals indicate the measurement orders, and the arrow indicates the measurement direction.

As shown in FIG. 20, the measurement is performed except for the non-measurable part HB from the measurement part BU1 in the clockwise direction. Although it is not shown in FIG. 20, the measurement position of the three-dimensional measuring device VD1 is also displayed in the measurement procedure picture HG6.

As shown in FIG. 21, it is understood that the surface of the measurement object Q1 is measured except for the measurement part BU2 that is a hole and the bottom.

In order to measure the bottom of the measurement object Q1, an appropriate manipulator may be used for lifting up the measurement object Q1, or a posture of the measurement object Q1 may be changed by setting the measurement object Q1 upside down or tilting it horizontally or in a slanting manner.

According to the above-described embodiment, when three-dimensional measurement of a measurement object Q is performed by using the three-dimensional measuring device VD, time and effort necessary for the measurement can be reduced by determining a measurable part automatically.

In the embodiment described above, it is possible only to display on the display device 12 without providing the control device 15 and the manipulator 16. Furthermore, a structure of a whole or a part of the processing device 11, the display device 12, the input device 13, the control device 15, the manipulator 16 and the three-dimensional measuring system 1, the circuit, the shape, dimensions, the number thereof, materials, process content or process order, a detail of the picture HG can be modified in accordance with the spirit of the present invention.

The present invention can be used for a three-dimensional measuring system that measures three-dimensional shapes of various measurement objects in a noncontact manner.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. A three-dimensional measuring system for measuring a three-dimensional shape of a measurement object in a non-contact manner, the system comprising:
   a first storage portion for storing arrangement information of the measurement object;
   a second storage portion for storing design shape information of the measurement object;
   a third storage portion for storing specifics information about one or more three-dimensional measuring devices;
   a determining portion for determining an unmeasurable part that cannot be measured by the one or more three-dimensional measuring devices about a surface shape of the measurement object in accordance with the stored arrangement information, the stored design shape information and the stored specifics information by determining at least one of the three following conditions is met:
   an amount of light reflected from a part to be measured of the measurement object does not fall within a first predetermined range, an interference object obscures the part to be measured of the measurement object from the three-dimensional measuring system, and tolerance of the part to be measured of the measurement object does not fall within a second predetermined range; and an output portion for outputting the determined unmeasurable part.

2. The system according to claim 1, further comprising a fourth storage portion for storing characteristics information about a surface state of the measurement object, wherein the determining portion determines the unmeasurable part by using the stored characteristics information.

3. The system according to claim 2, wherein the characteristics information is information obtained from CAD data of the measurement object.

4. The system according to claim 2, wherein the characteristics information is information entered by a user who operates an input portion.

5. The system according to claim 1, wherein the output portion displays the determined unmeasurable part on a screen of a display device.

6. The system according to claim 1, wherein the determining portion determines an optimal measurement condition for measuring the unmeasurable part by the one or more three-dimensional measuring devices when the unmeasurable part is determined, and the output portion outputs the determined optimal measurement condition.

7. The system according to claim 6, further comprising a manipulator that is capable of moving and positioning the one or more three-dimensional measuring devices, wherein the manipulator is adapted to be controlled in accordance with the determined optimal measurement condition outputted from the output portion.

8. The system according to claim 1, wherein the design shape information is information obtained from CAD data of the measurement object.

9. The system according to claim 1, wherein the design shape information is master measured shape data information obtained by a measurement using the one or more three-dimensional measuring devices.

10. A three-dimensional measuring system for measuring a three-dimensional shape of a measurement object in a noncontact manner, the system comprising:

a first storage portion for storing arrangement information of the measurement object;

a second storage portion for storing design shape information of the measurement object;

a third storage portion for storing specifics information about one or more three-dimensional measuring devices;

a fourth storage portion for storing a measurement allowable number of times in measuring the measurement object by the one or more three-dimensional measuring devices;

a determining portion for determining an unmeasurable part that cannot be measured by the one or more three-dimensional measuring devices about a surface shape of the measurement object in accordance with the stored arrangement information, the stored design shape information, the stored specifics information and the stored measurement allowable number of times by determining at least one of the three following conditions is met:

an amount of light reflected from a part to be measured of the measurement object does not fall within a first predetermined range, an interference object obscures the part to be measured of the measurement object from the three-dimensional measuring system, and tolerance of the part to be measured of the measurement object does not fall within a second predetermined range; and an output portion for outputting the determined unmeasurable part.

11. A method for measuring a three-dimensional shape of a measurement object in a noncontact manner, the method comprising:

obtaining arrangement information of a measurement object;

obtaining design shape information of the measurement object;

obtaining specifics information about one or more three-dimensional measuring devices;

determining an unmeasurable part that cannot be measured by the one or more three-dimensional measuring devices about a surface shape of the measurement object in accordance with the obtained arrangement information, the obtained design shape information and the obtained specifics information by determining at least one of the following three conditions is met:

an amount of light reflected from a part to be measured of the measurement object does not fall within a first predetermined range, an interference object obscures the part to be measured of the measurement object from at least one of the one or more three-dimensional measuring devices, and tolerance of the part to be measured of the measurement object does not fall within a second predetermined range; and outputting the determined unmeasurable part.

12. The method according to claim 11, further comprising obtaining characteristics information about a surface state of the measurement object, wherein the unmeasurable part is also determined in accordance with the obtained characteristics information.

13. The method according to claim 12, wherein obtaining characteristics information comprises obtaining information from CAD data of the measurement object.

14. The method according to claim 12, wherein obtaining characteristics information comprises entering information by a user who operates an input portion.

15. The method according to claim 11, wherein outputting the determined unmeasurable part comprises displaying the determined unmeasurable part on a screen of a display device.

16. The method according to claim 11, further comprising determining an optimal measurement condition for measuring the unmeasurable part by the one or more three-dimensional measuring devices when the unmeasurable part is determined, and outputting the determined optimal measurement condition.

17. The system according to claim 16, further comprising providing a manipulator that is capable of moving and positioning the one or more three-dimensional measuring devices, wherein the manipulator is adapted to be controlled in accordance with the determined optimal measurement condition outputted from the output portion.

18. The method according to claim 11, wherein obtaining design shape information of the measurement object comprises obtaining the design shape information from CAD data of the measurement object.

19. The method according to claim 11, wherein obtaining design shape information of the measurement object comprises measuring master measured shape data information using the one or more three-dimensional measuring devices.

20. A three-dimensional measuring system for measuring a three-dimensional shape of a measurement object in a non-contact manner, the system comprising:
- means for obtaining arrangement information of a measurement object;
- means for obtaining design shape information of the measurement object;
- means for obtaining specifics information about one or more three-dimensional measuring devices;
- a determining portion for determining an unmeasurable part that cannot be measured by the one or more three-dimensional measuring devices about a surface shape of the measurement object in accordance with the obtained arrangement information, the obtained design shape information and the obtained specifics information by determining at least one of the three following conditions is met:
- an amount of light reflected from a part to be measured of the measurement object does not fall within a first predetermined range,
- an interference object obscures the part to be measured of the measurement object from the three-dimensional measuring system, and
- tolerance of the part to be measured of the measurement object does not fall within a second predetermined range; and
- an output portion for outputting the determined unmeasurable part.

21. The system according to claim 20, further comprising means for obtaining characteristics information about a surface state of the measurement object, wherein the determining portion determines the unmeasurable part by using the obtained characteristics information.

22. The system according to claim 21, wherein the characteristics information is information obtained from CAD data of the measurement object.

23. The system according to claim 21, wherein the characteristics information is information entered by a user who operates an input portion.

24. The system according to claim 20, wherein the output portion displays the determined unmeasurable part on a screen of a display device.

25. The system according to claim 20, wherein the determining portion also determines an optimal measurement condition for measuring the unmeasurable part by the one or more three-dimensional measuring devices when the unmeasurable part is determined, and the output portion outputs the determined optimal measurement condition.

26. The system according to claim 25, further comprising a manipulator that is capable of moving and positioning the one or more three-dimensional measuring devices, wherein the manipulator is adapted to be controlled in accordance with the determined optimal measurement condition outputted from the output portion.

27. The system according to claim 20, wherein the design shape information is information obtained from CAD data of the measurement object.

28. The system according to claim 20, wherein the design shape information is master measured shape data information obtained by a measurement using the one or more three-dimensional measuring devices.

29. A three-dimensional measuring system for measuring a three-dimensional shape of a measurement object in a non-contact manner, the system comprising:
- means for obtaining arrangement information of a measurement object;
- means for obtaining design shape information of the measurement object;
- means for obtaining specifics information about one or more three-dimensional measuring devices;
- means for obtaining a measurement allowable number of times in measuring the measurement object by the one or more three-dimensional measuring devices;
- a determining portion for determining an unmeasurable part that cannot be measured by the one or more three-dimensional measuring devices about a surface shape of the measurement object in accordance with the obtained arrangement information, the obtained design shape information, the obtained specifics information and the obtained measurement allowable number of times by determining at least one of the three following conditions is met:
- an amount of light reflected from a part to be measured of the measurement object does not fall within a first predetermined range,
- an interference object obscures the part to be measured of the measurement object from the three-dimensional measuring system, and
- tolerance of the part to be measured of the measurement object does not fall within a second predetermined range; and
- an output portion for outputting the determined unmeasurable part.

* * * * *